United States Patent
Davis

(10) Patent No.: US 10,486,568 B2
(45) Date of Patent: Nov. 26, 2019

(54) SEAT ASSEMBLIES INCLUDING AN ARMREST WITH AN ARMREST LID AND A HINGE ARRANGEMENT

(71) Applicant: Gulfstream Aerospace Corporation, Savannah, GA (US)

(72) Inventor: Timothy Allen Davis, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 0 days.

(21) Appl. No.: 16/002,826

(22) Filed: Jun. 7, 2018

(65) Prior Publication Data

US 2018/0361898 A1    Dec. 20, 2018

Related U.S. Application Data

(60) Provisional application No. 62/519,385, filed on Jun. 14, 2017.

(51) Int. Cl.
*B60N 2/75* (2018.01)
*B64D 11/06* (2006.01)

(52) U.S. Cl.
CPC ............ *B60N 2/793* (2018.02); *B60N 2/797* (2018.02); *B64D 11/0627* (2014.12)

(58) Field of Classification Search
CPC ..... B60N 2/793; B60N 2/797; B64D 11/0627
USPC ........................... 297/188.14, 188.19, 188.01
See application file for complete search history.

(56) References Cited

U.S. PATENT DOCUMENTS

| | | | | |
|---|---|---|---|---|
| 5,121,521 A * | 6/1992 | Hagiwara | ................ | B41J 29/13 16/278 |
| 5,722,703 A * | 3/1998 | Iwamoto | .................. | B60N 2/77 292/1 |
| 5,893,478 A * | 4/1999 | Maruoka | .................... | B60R 7/04 16/354 |
| 6,286,793 B1 * | 9/2001 | Hirose | .................... | B60N 2/793 297/411.38 X |
| 6,789,831 B2 * | 9/2004 | Schmidt | ................. | B60K 37/06 296/37.12 |
| 6,832,412 B2 * | 12/2004 | Kim | ....................... | E05F 1/1215 297/188.19 X |
| 7,044,529 B2 * | 5/2006 | Svenson | .................... | B60R 7/06 296/37.12 |
| 7,064,285 B2 * | 6/2006 | Ichimaru | ............... | E05F 1/1066 200/293 |

(Continued)

*Primary Examiner* — Rodney B White
(74) *Attorney, Agent, or Firm* — LKGlobal | Lorenz & Kopf, LLP

(57) ABSTRACT

Seat assemblies are provided. In one example, a seat assembly includes a seat base portion and a seat backrest portion. An armrest is disposed adjacent to the seat base portion and forward of the backrest portion. The armrest includes a fixed armrest portion that is coupled to the seat frame. An armrest lid is configured to move relative to the fixed armrest portion between a closed position overlying an upper section of the fixed armrest portion and an open position allowing access to the upper section of the fixed armrest portion. A hinge arrangement is pivotally couples the armrest lid to the fixed armrest portion. The hinge arrangement includes a damper and a damper gear that meshes with the damper to dampen movement of the armrest lid between the closed and open positions.

17 Claims, 24 Drawing Sheets

(56) References Cited

U.S. PATENT DOCUMENTS

| | | | | |
|---|---|---|---|---|
| 7,127,778 B2* | 10/2006 | Salice | E05F 5/006 | 16/354 |
| 7,407,200 B2* | 8/2008 | Ichimaru | E05O 17/02 | 292/194 |
| 7,451,888 B2* | 11/2008 | Tanaka | B65D 43/26 | 220/263 |
| 7,591,395 B2* | 9/2009 | Hamaguchi | E05C 19/022 | 220/830 |
| 7,766,407 B2* | 8/2010 | Nakaya | B60N 3/08 | 292/334 |
| 7,850,244 B2* | 12/2010 | Salewski | B60N 2/757 | 297/411.32 |
| 8,074,832 B2* | 12/2011 | Fujiwara | B60R 7/04 | 296/24.34 X |
| 8,100,453 B2* | 1/2012 | Shimajiri | B60R 7/04 | 296/37.8 |
| 8,430,440 B1* | 4/2013 | Simon | B60N 3/10 | 296/24.34 |
| 8,794,473 B2* | 8/2014 | Kang | B60R 7/04 | 220/326 |
| 9,409,522 B2* | 8/2016 | Simon | B60R 7/046 | |
| 9,511,720 B2* | 12/2016 | Harding | B60R 11/02 | |
| 9,650,182 B2* | 5/2017 | Fukumoto | B60R 7/04 | |
| 9,688,409 B2* | 6/2017 | Suzuki | B64D 11/0636 | |
| 9,796,314 B2* | 10/2017 | Neumann | B60N 3/102 | |
| 10,023,088 B2* | 7/2018 | Anderson | B60R 7/04 | |
| 2003/0080131 A1* | 5/2003 | Fukuo | B60R 7/04 | 220/264 |
| 2003/0234554 A1* | 12/2003 | Maierholzner | B60N 2/793 | 296/153 |
| 2007/0034636 A1* | 2/2007 | Fukuo | B60R 7/06 | 220/830 |
| 2009/0079228 A1* | 3/2009 | Sturt | B60N 2/78 | 296/153 |
| 2010/0066113 A1* | 3/2010 | Browne | B60N 3/102 | 296/24.34 |
| 2015/0239375 A1* | 8/2015 | Anderson | B60R 7/04 | 296/37.8 |
| 2017/0267134 A1* | 9/2017 | Anderson | B60N 2/793 | |
| 2017/0341544 A1* | 11/2017 | Bozio | B60R 7/04 | |
| 2018/0162282 A1* | 6/2018 | Anderson | B60N 2/75 | |

* cited by examiner

SEAT ASSEMBLIES INCLUDING AN ARMREST WITH AN ARMREST LID AND A HINGE ARRANGEMENT

CROSS-REFERENCE TO RELATED APPLICATIONS

This application is related to and claims all available benefit of U.S. Provisional Patent Application 62/519,385 filed Jun. 14, 2017, the entire contents of which are herein incorporated by reference.

TECHNICAL FIELD

The technical field relates generally to seat assemblies, and more particularly, relates to seat assemblies, such as for an aircraft or the like, that include an armrest with an armrest lid and a hinge arrangement for opening and closing the armrest lid.

BACKGROUND

Current seat assemblies, for example, for the commercial and/or military transportation industries (e.g., aircrafts, motor vehicles, and the like) often include an armrest that utilize a single pivot hinge for opening and closing an armrest lid. Because the seats may be stowed outboard immediately adjacent to a sidewall ledge that includes, for example, a drinking rail, storage area, and/or the like, space for opening and closing the armrest lid can be very limited. This limited space can make it difficult and/or prevent the use of a functional armrest lid that can open and close, for example, on the outboard side of the seat adjacent to the cabin sidewall because the lid may interfere with the sidewall ledge when the seats are stowed outboard. Further, current armrest lids (e.g., positioned on the inboard and/or outboard side(s) of a seat assembly) can unintentionally flop open or closed, for example, when a passenger is getting out of the seat and pushes down and outward on the armrest lid(s), thereby causing the armrest lid(s) to open, rotating outward away of the passenger.

Accordingly, it is desirable to provide seat assemblies including an armrest with an armrest lid that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Seat assemblies including an armrest are provided herein. In an exemplary embodiment, a seat assembly includes a seat base portion and a seat backrest portion that include at least in part a seat frame that supports the seat backrest portion extending substantially upright from the seat base portion. An armrest is disposed adjacent to the seat base portion and forward of the backrest portion. The armrest includes a fixed armrest portion that is coupled to the seat frame. An armrest lid is configured to move relative to the fixed armrest portion between a closed position overlying an upper section of the fixed armrest portion and an open position allowing access to the upper section of the fixed armrest portion. A hinge arrangement is pivotally couples the armrest lid to the fixed armrest portion. The hinge arrangement includes a damper and a damper gear that meshes with the damper to dampen movement of the armrest lid between the closed and open positions.

In an exemplary embodiment, a seat assembly includes a seat base portion and a seat backrest portion that include at least in part a seat frame that supports the seat backrest portion extending substantially upright from the seat base portion. An armrest is disposed adjacent to the seat base portion and forward of the backrest portion. The armrest has a first end section and a second end section that is opposite the first end section. The armrest includes a fixed armrest portion that is coupled to the seat frame. An armrest lid is configured to move relative to the fixed armrest portion between a closed position overlying an upper section of the fixed armrest portion and an open position allowing access to the upper section of the fixed armrest portion. A first hinge arrangement is disposed in the first end section of the armrest and pivotably couples a first part of the armrest lid to the fixed armrest portion. The first hinge arrangement includes a damper and a damper gear that meshes with the damper to dampen movement of the armrest lid between the closed and open positions. A second hinge arrangement is disposed in the second end section of the armrest and pivotably couples a second part of the armrest lid to the fixed armrest portion. The second hinge arrangement defines a track and the hinge arrangement further includes a guide bearing or a link coupled to the armrest lid and movably disposed in the track to limit a range of opening of the armrest lid.

BRIEF DESCRIPTION OF THE DRAWINGS

The various embodiments will hereinafter be described in conjunction with the following drawing figures, wherein like numerals denote like elements, and wherein:

FIGS. 2-7 are sectional views of a first end of the armrest lid and the hinge arrangement during various stages of opening and/or closing the armrest lid;

FIGS. 8-10 are perspective side views of the armrest lid and the hinge arrangement during various stages of opening and/or closing the armrest lid;

FIGS. 11-13 are sectional views of a second end of the armrest lid and the hinge arrangement during various stages of opening and/or closing the armrest lid;

FIGS. 14-20 are sectional views of a first end of the armrest lid and the hinge arrangement during various stages of opening and/or closing the armrest lid;

FIGS. 21-24 are perspective side views of the armrest lid and the hinge arrangement during various stages of opening and/or closing the armrest lid; and FIGS. 25-27 are sectional views of a second end of the armrest lid and the hinge arrangement during various stages of opening and/or closing the armrest lid.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to seat assemblies including an armrest with an armrest lid and a hinge arrangement for opening and closing the armrest lid. In a first exemplary embodiment, a seat assembly includes a hinge arrangement for an armrest lid including two guide bearings in a track. The two guide bearings are coupled via a linkage to a damper gear that meshes with a damper (e.g., rotary damper) that is mounted on the fixed portion of the armrest of the seat structure to control and limit opening and/or closing of the armrest lid. The two guide bearings in the track control and limit the range of opening of the armrest lid so that the armrest lid does not interfere, for example, with a sidewall ledge when the seat is stowed outboard. Further, the damper gear and the rotary damper dampen movement (e.g., dampen or control speed and force) of the armrest lid during opening and closing to help prevent the armrest lid from unintentionally opening and closing, for example, when a passenger is getting out of the seat or otherwise.

In a second exemplary embodiment, a seat assembly include a hinge arrangement for the armrest including two links, e.g., an upper link and a lower link. The two links control opening and/or closing of the armrest lid. The upper link helps limit the range of opening of the armrest lid so that the armrest lid does not interfere, for example, with the sidewall ledge when the seat is stowed outboard. Further, the lower link is coupled to a damper gear which meshes with a damper (e.g., rotary damper) that is mounted on the armrest portion of the seat structure to dampen movement (e.g., dampen or control speed and force) of the armrest lid during opening and closing to help prevent the armrest lid from unintentionally opening and closing, for example, when a passenger is getting out of the seat or otherwise.

Figure 1:
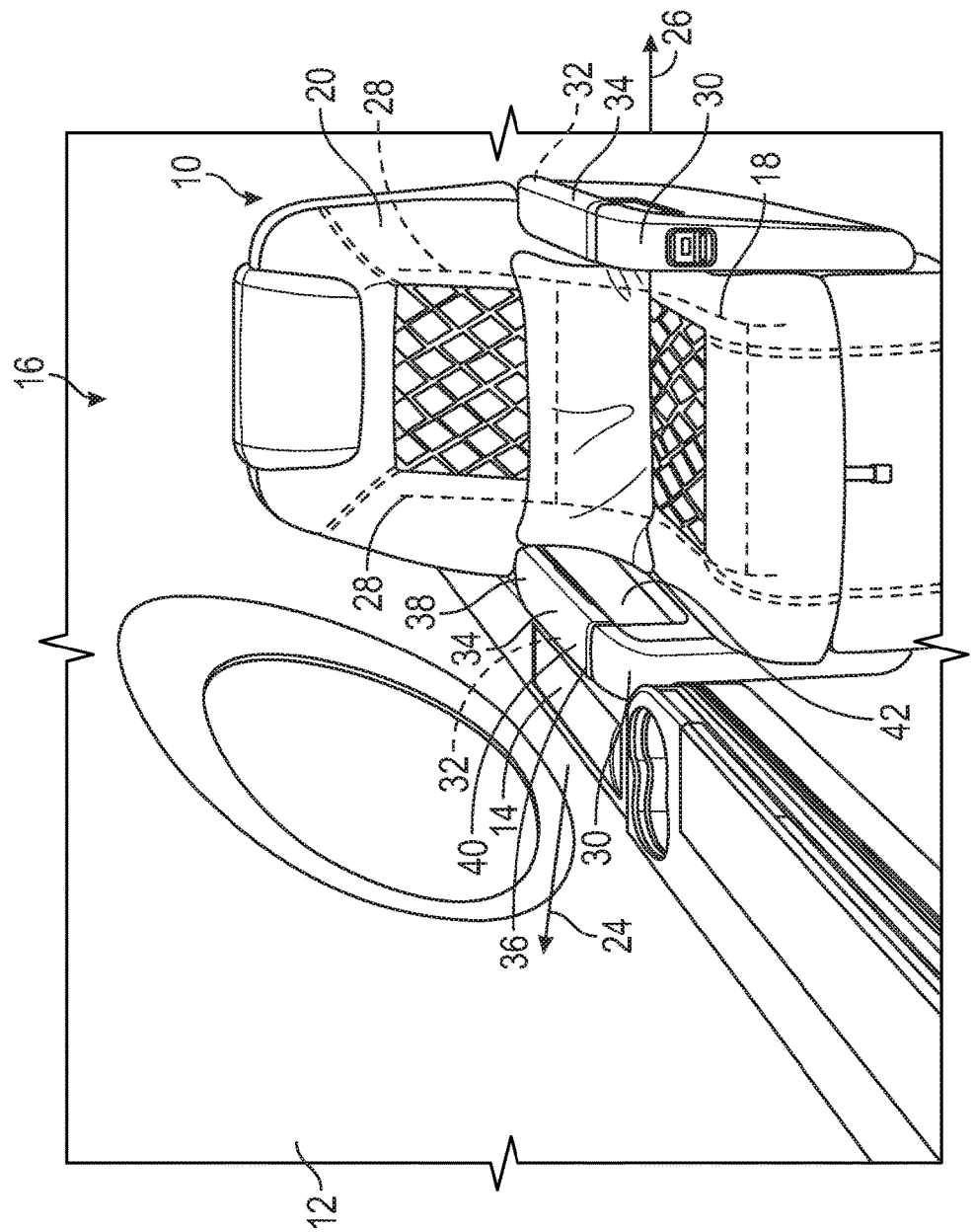
FIG. 1 illustrates a perspective front view of a seat assembly including an armrest in accordance with an exemplary embodiment.

FIG. 1 illustrates a perspective front view of a seat assembly 10 in accordance with an exemplary embodiment. As illustrated, the seat assembly 10 is arranged adjacent to an outboard sidewall 12 including adjacent to a ledge 14 in a cabin 16 (e.g., aircraft cabin). The seat assembly 10 includes a seat portion 18, a backrest portion 20, and two armrests 22. The armrest 22 are disposed adjacent to the seat base portion 18 and forward of the seat backrest portion 20 correspondingly facing the outboard side (indicated by single headed arrow 24) and inboard side (indicated by single headed arrow 26) of the cabin 16, respectively.

As illustrated, the seat backrest portion 20 extends substantially upright from the seat base portion 18. In one example, the seat backrest portion 20 is fixedly coupled to the seat base portion 18 such that the seat backrest portion 20 is permanently set in a substantially upright configuration. In another example, the seat assembly 10 is an adjustable seat assembly in which the seat backrest portion 20 is pivotably coupled to the seat base portion 18 for movement between a substantially upright position and, for example, a substantially reclined and/or inclined (e.g., forward leaning) position(s).

The seat assembly 10 includes a seat frame 28 that forms at least part of the seat base portion 18 and the seat backrest portion 20 and supports the seat backrest portion 20 extending substantially upright from the seat base portion 18 as discussed above. The seat frame 28 is formed of a relatively rigid support material such as metal, e.g., aluminum or the like, composite, or any other frame structure material(s) known to those skilled in the art.

The armrests 22 each include a fixed armrest portion 30 that is coupled (e.g., directly coupled or indirectly coupled) to the seat frame 28 that supports the armrest 22, associated armrest trim, brackets, and/or the like that are attached to the seat frame 28. As will be discussed in further detail below, pivotably attached to each of the fixed armrest portion 30 via a hinge arrangement 32, is an armrest lid 34. The armrest lid 34 is configured to move relative to the fixed armrest portion 30 between a closed position 40 overlying an upper section 42 of the fixed armrest portion 30 and an open position 44 (see FIG. 7) allowing access to the upper section 42 of the fixed armrest portion 30.

Figure 7:
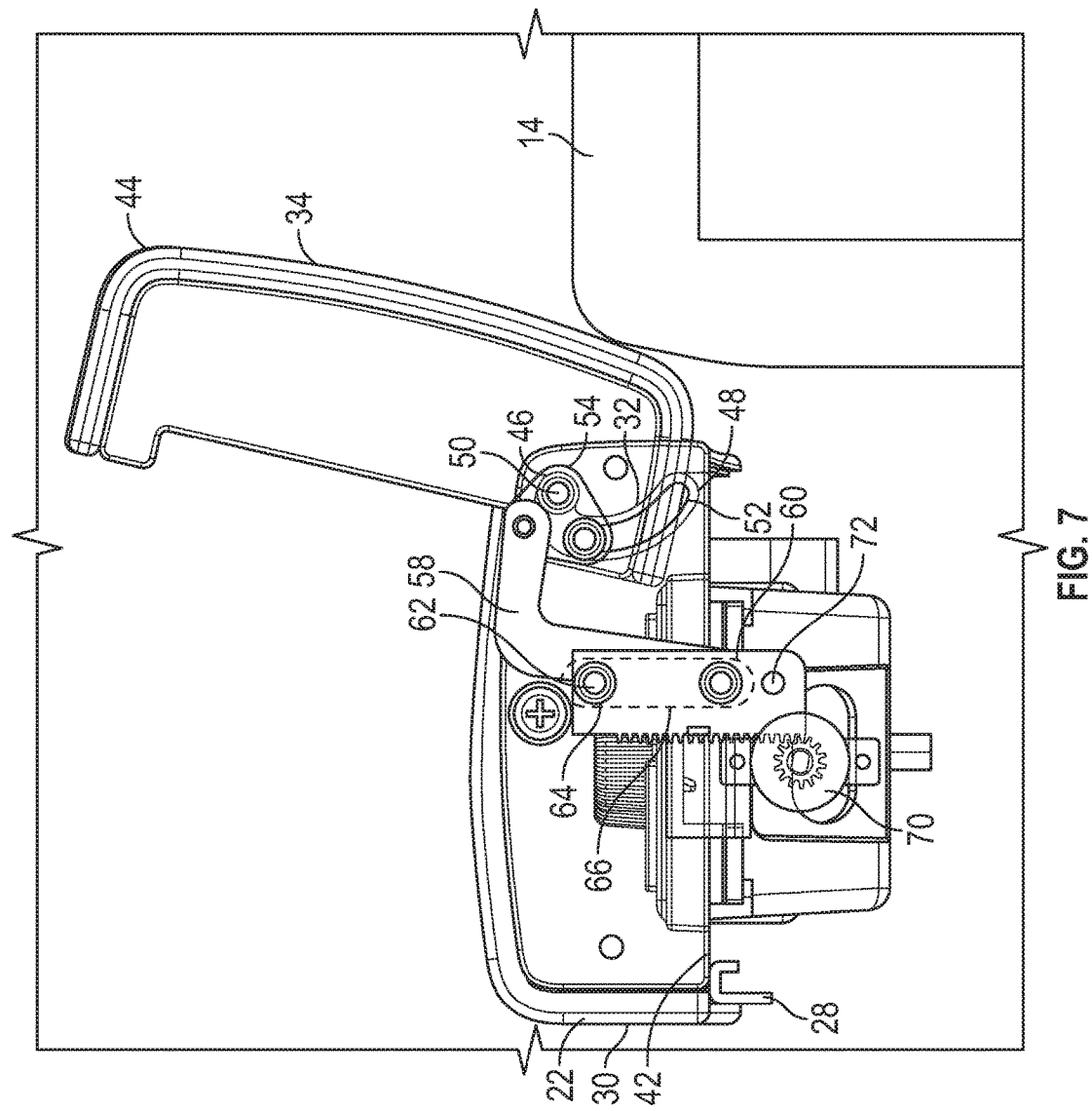
Figure 8:
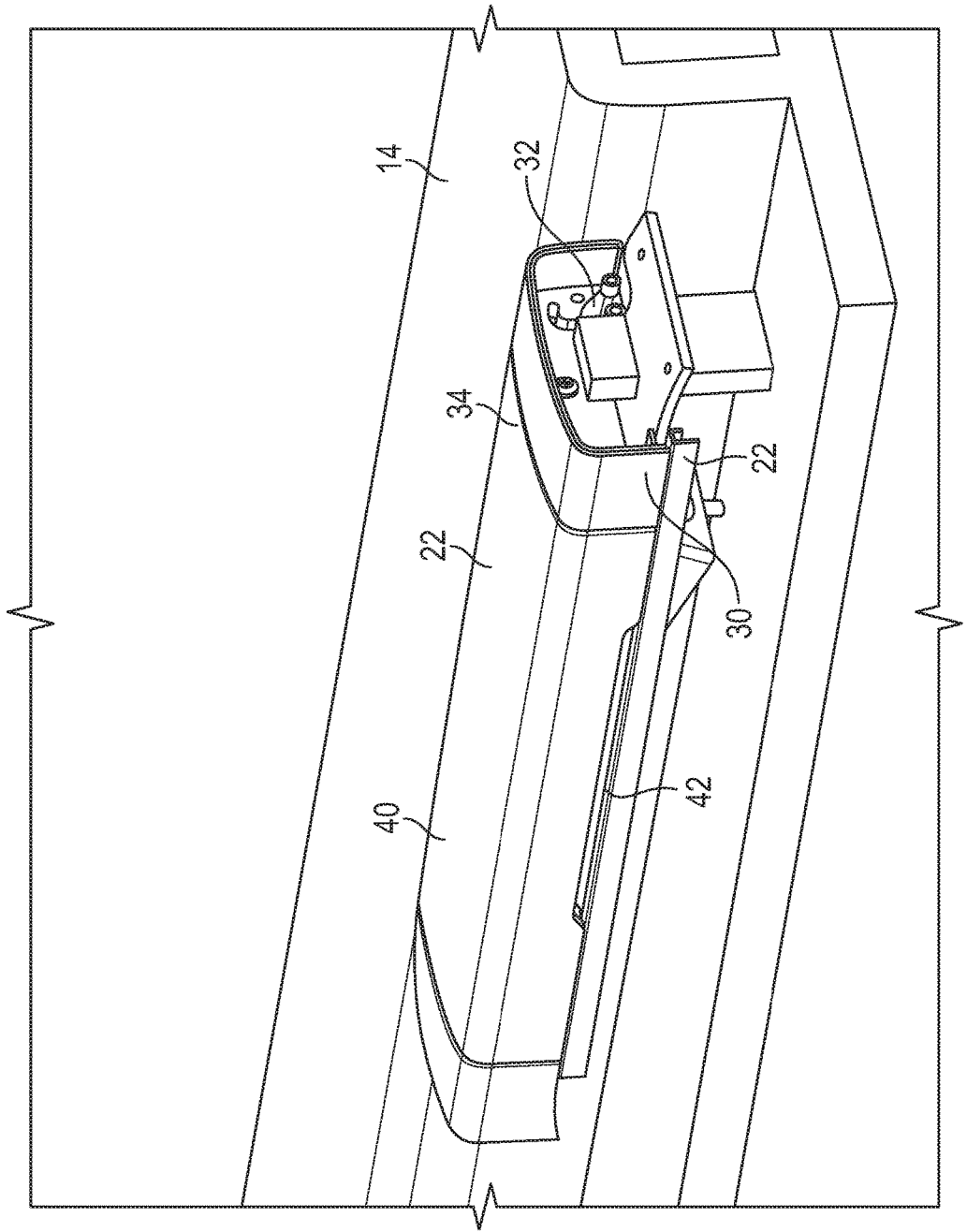
Figure 9:
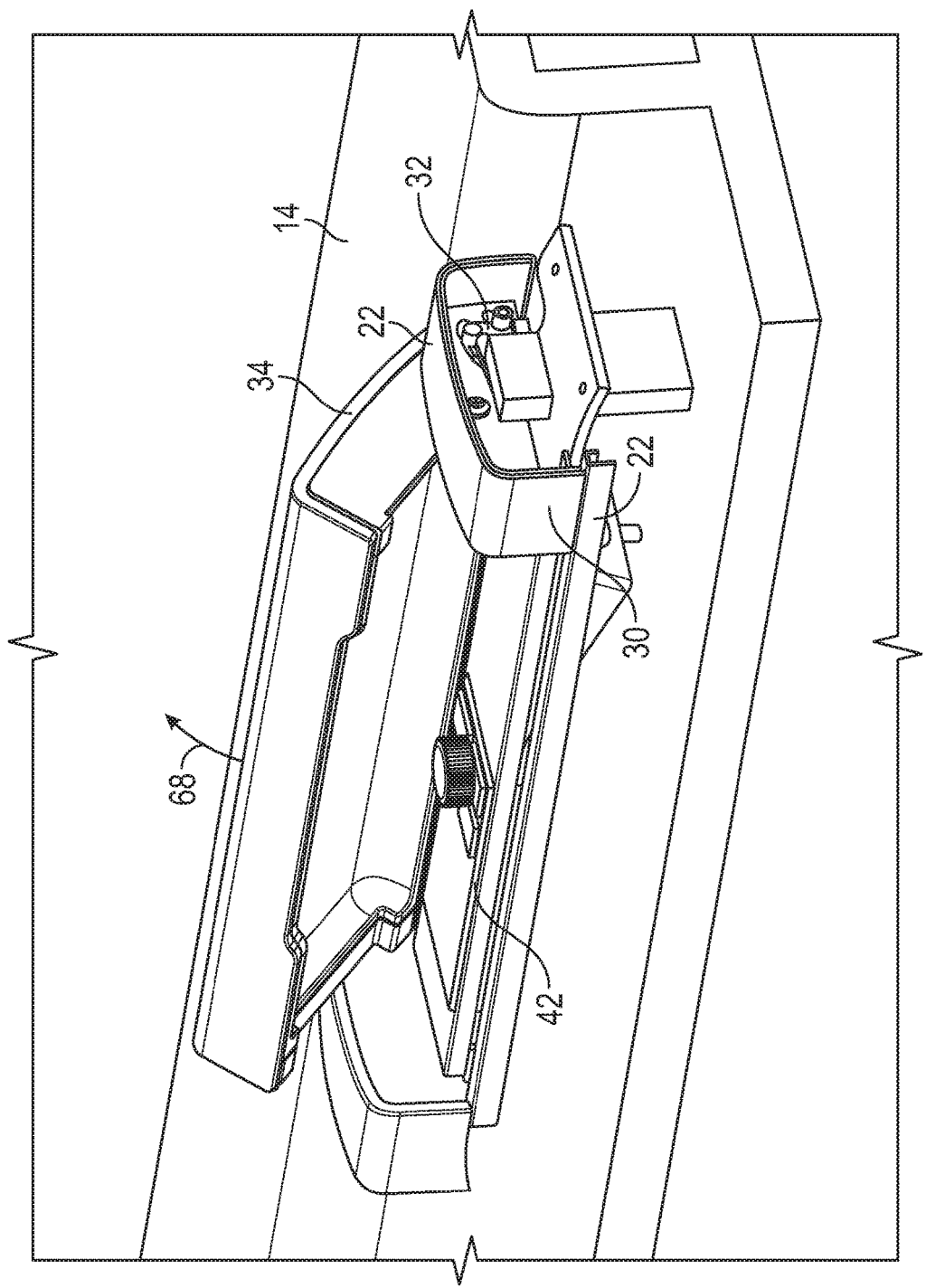
Figure 10:
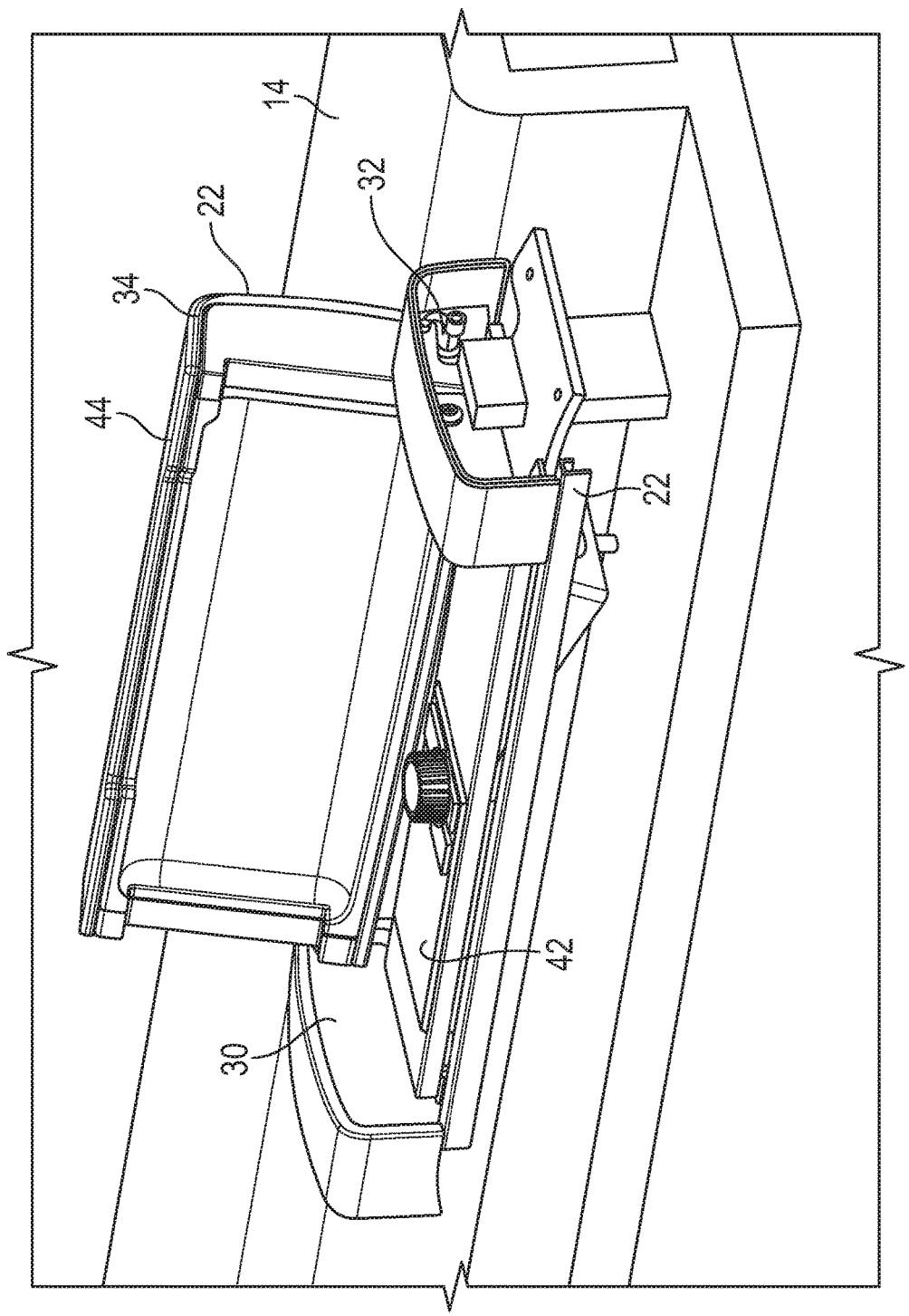
Figure 11:
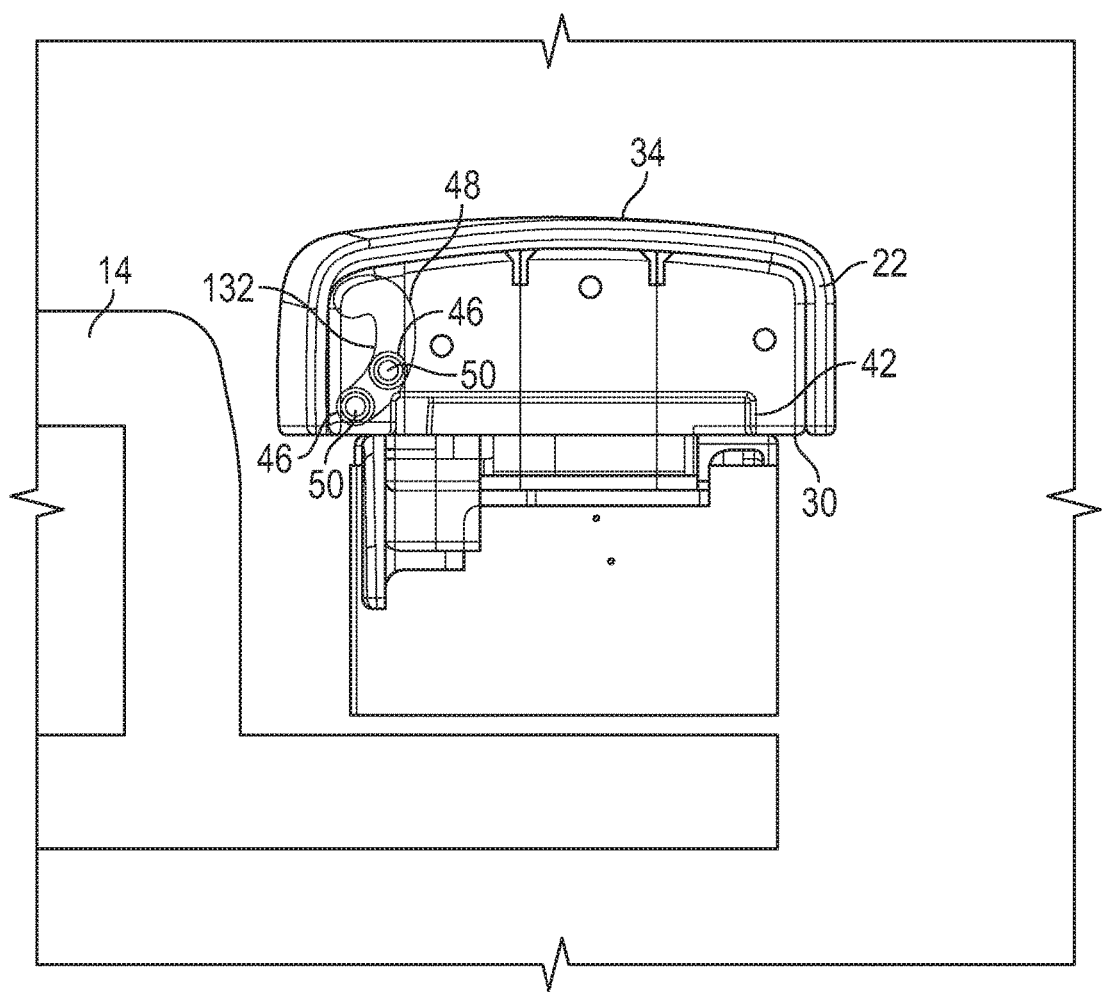
Figure 12:
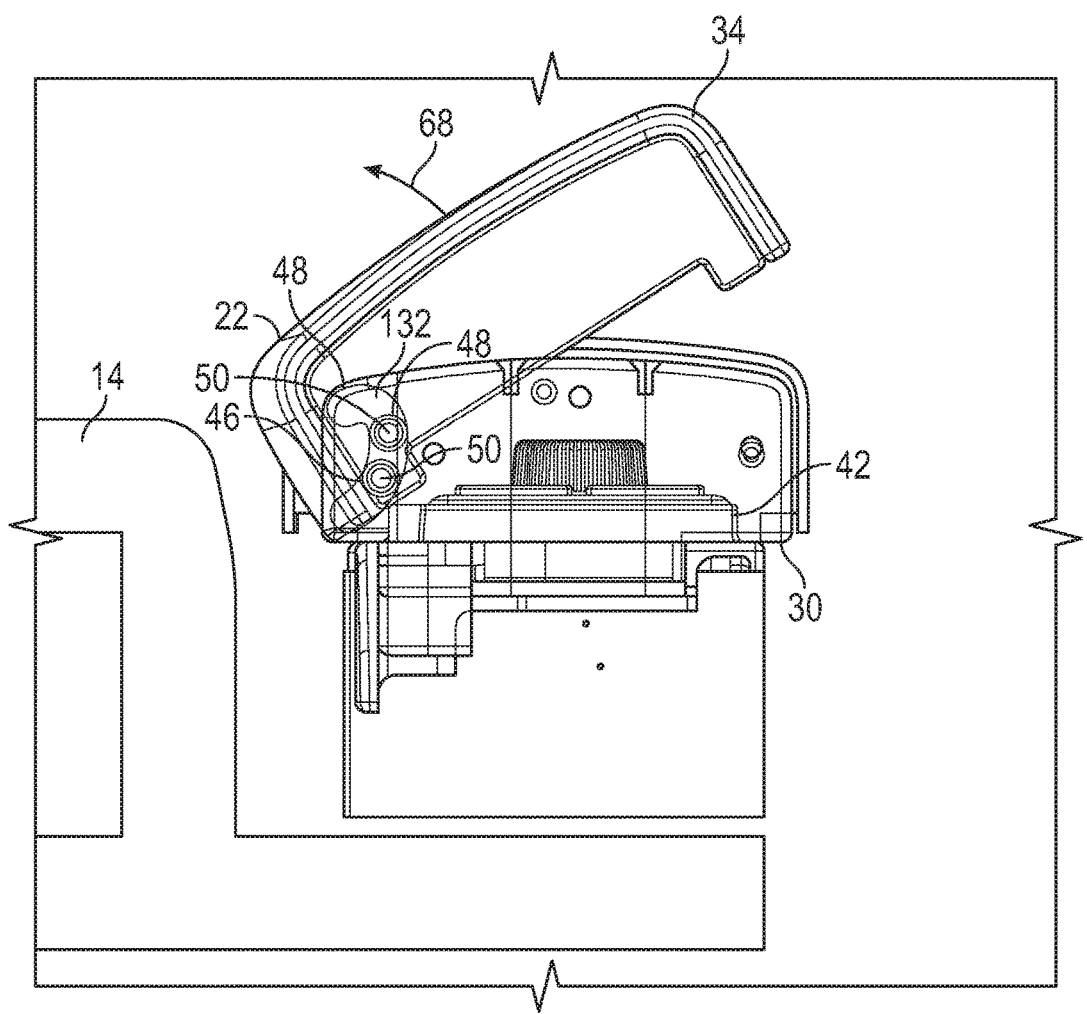
Figure 13:
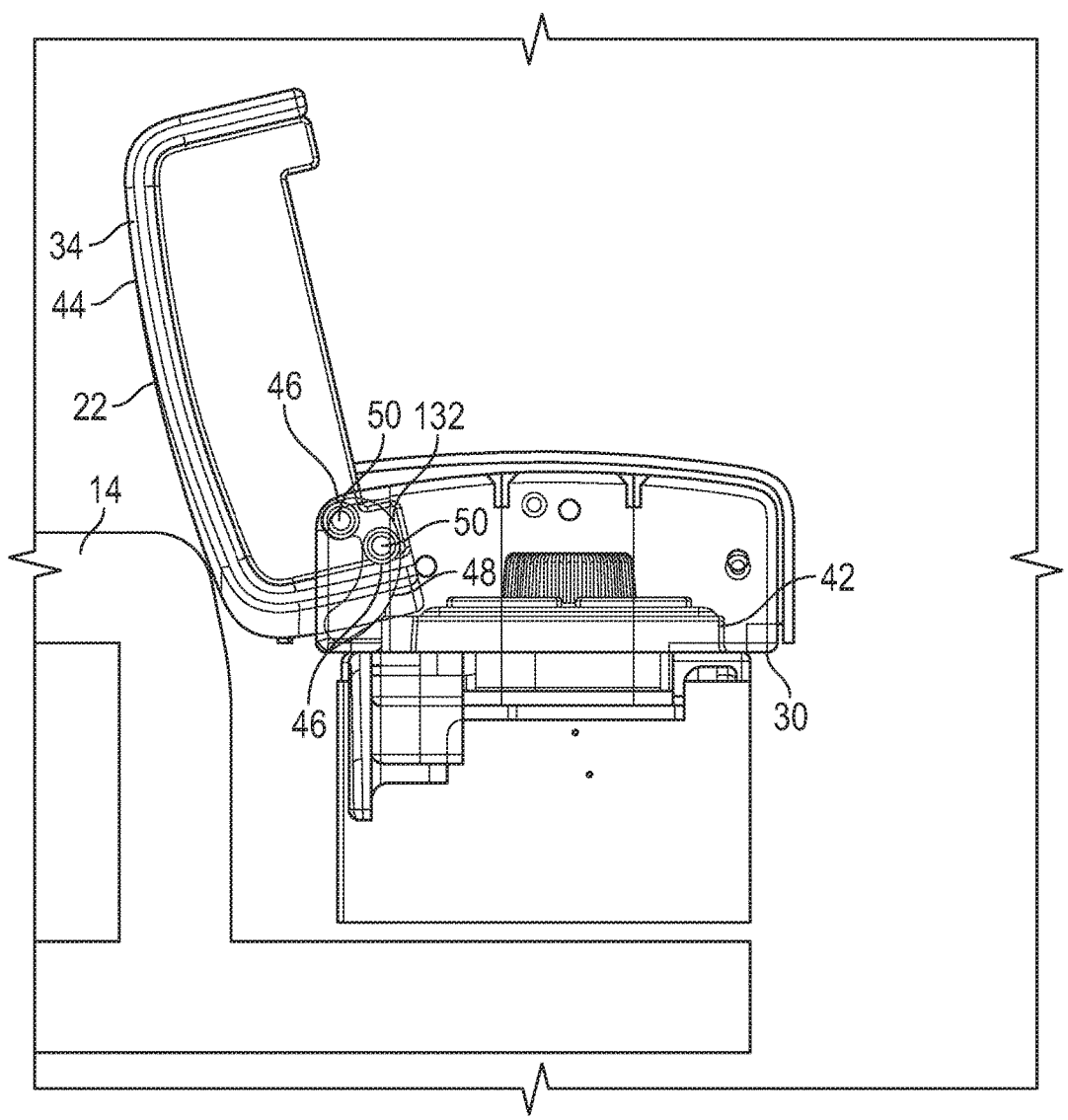

FIGS. 2-13 includes various views of the armrest 22 including the armrest lid 34 and the hinge arrangement 32 in accordance with a first exemplary embodiment. FIGS. 2-7 are sectional views of a first end (e.g., forward end 36 or rearward end 38) of the armrest lid 34 and hinge arrangement 32 during various stages of opening and/or closing (movement between the closed position 40 and the open position 44) the armrest lid 34, FIGS. 8-10 are perspective side views of the armrest lid 34 and hinge arrangement 32 during various stages of opening and/or closing the armrest lid 34, and FIGS. 11-13 are sectional views of a second end (e.g., the other of the forward end 36 or rearward end 38) of the armrest lid 34 and hinge arrangement 32 during various stages of opening and/or closing the armrest lid 32. As indicated, the first end of the armrest lid 34 may be a forward armrest lid end 36, or alternatively, a rearward armrest lid end 38, and the second end of the armrest lid 34 is an end of the armrest lid 34 opposite the first end (see FIG. 1).

Referring to FIGS. 2-10, as discussed above, each armrest 22 includes the fixed armrest portion 30, and the armrest lid 34 that is pivotably coupled to the fixed armrest portion 30 by the hinge arrangement 32. As illustrated, the hinge arrangement 32 includes two guide bearings 46 that are disposed in a track 48 (e.g., recess, or depression) that, for example, has a curved shape. Disposed between each of the guide bearings 46 is a shaft 50 (e.g., pin or like) that is attached to the armrest lid 34. The track 48 is formed into the fixed armrest portion 30. A curved slot 52 is formed within the track 48, and likewise in the fixed armrest portion 30. The shafts 50 are disposed through the slot 52 such that the guide bearings 46 can move within the track 48 when the armrest lid 34 is moved. In one example, the guide bearings 46 can rotate freely around the shafts 50.

A coupler link 54 has two holes 56 that receive portions of the shafts 50 opposite the ends that are attached to the fixed armrest portion 30. In this example, the coupler link 54 is illustrated having a substantially triangular shape. Rotationally coupled to the coupler link 54 is a damper link 58 which in this example is illustrated having a substantially "L-shaped." The damper link 58 is rotationally coupled to a damper gear 60 by a shaft/pin 62 in a lower portion of the damper gear 60. The damper gear 60 has two pins or shafts 62 with bearings 64 correspondingly coupled (e.g., rotationally coupled) to the pins or shafts 62. The two bearings 64 run in a vertical track 66 (e.g., slot or the like) formed in the fixed armrest portion 30. As such, the coupler link 54 and the damper link 58 formed a linkage coupling the guide bearings 46 to the damper gear 60 to move the damper gear 60 during movement of the armrest lid 34. The damper gear 60 has teeth that mesh with teeth of a damper 70 (e.g., rotary damper) that is attached to the fixed armrest portion 30. As such and as further discussed below, the coupler link 54 and the damper link 58 formed at least part of a linkage that couples the guide bearings 46 in the track 48 to the damper gear 60 to move the damper gear 60 during movement of the armrest lid 34.

Figure 2:
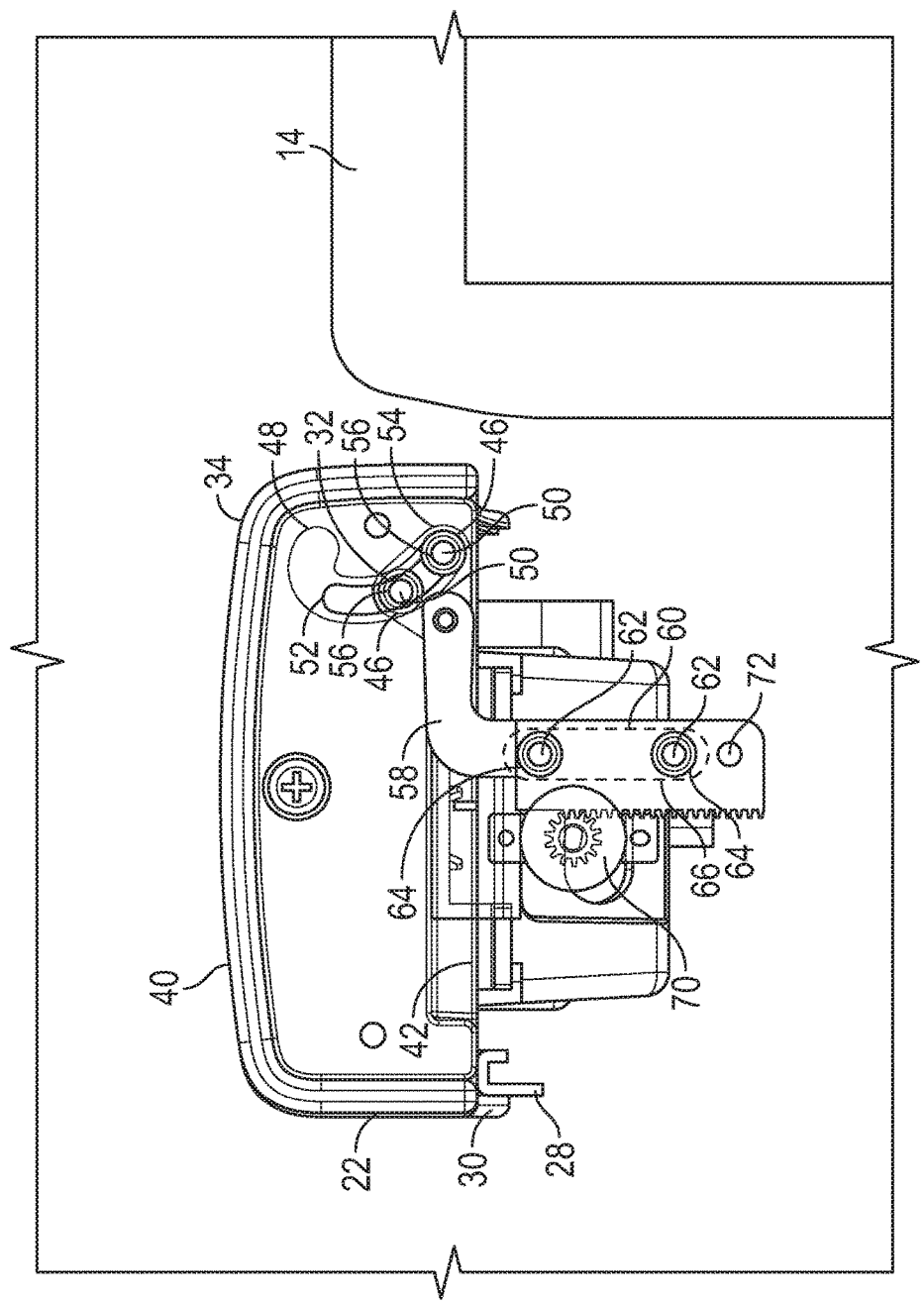
FIGS. 2-13 includes various views of an armrest including an armrest lid and a hinge arrangement in accordance with an exemplary embodiment.
Figure 3:
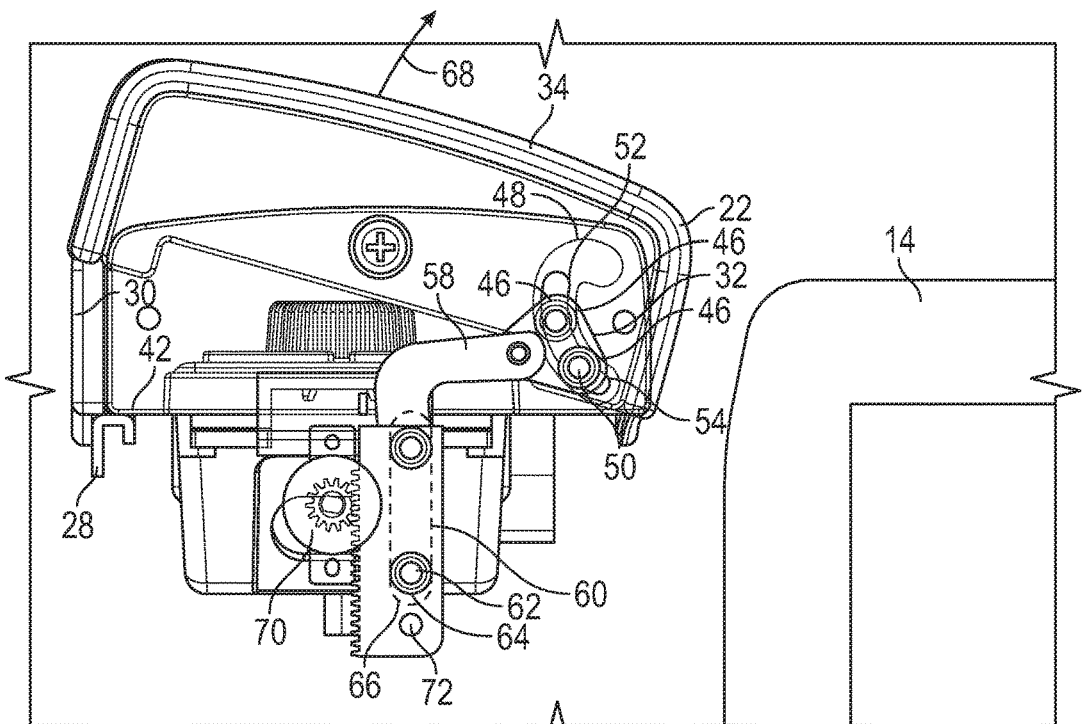
Figure 4:
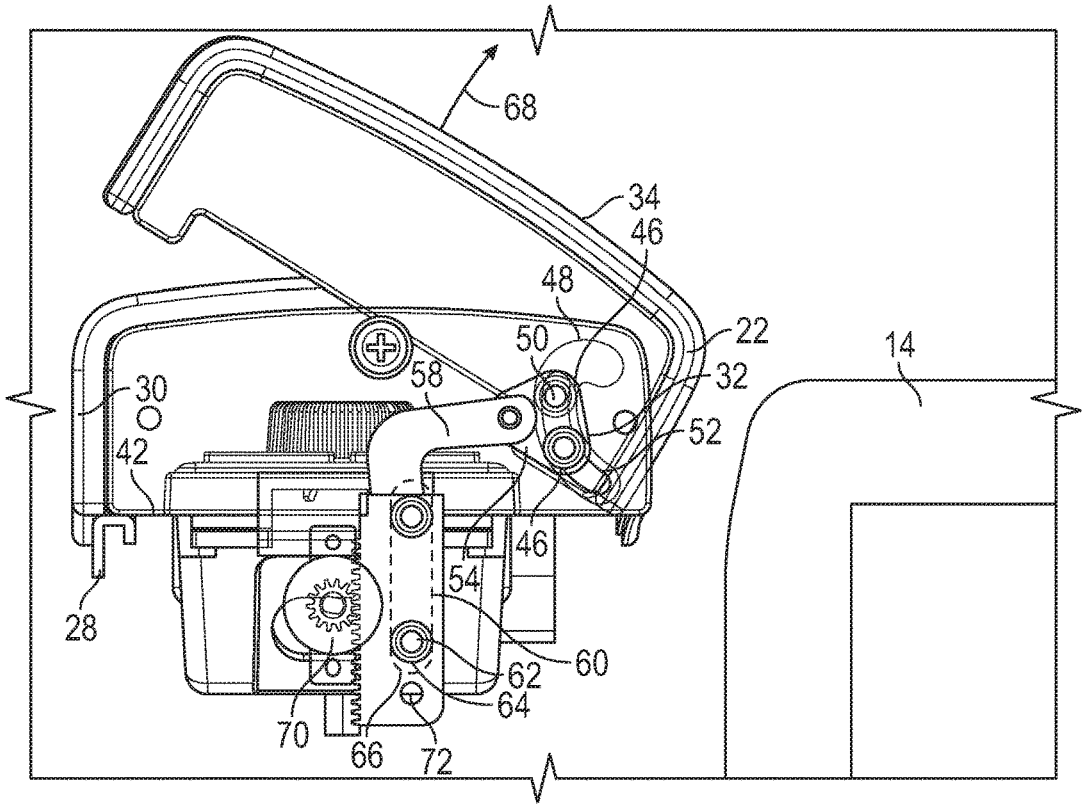
Figure 5:
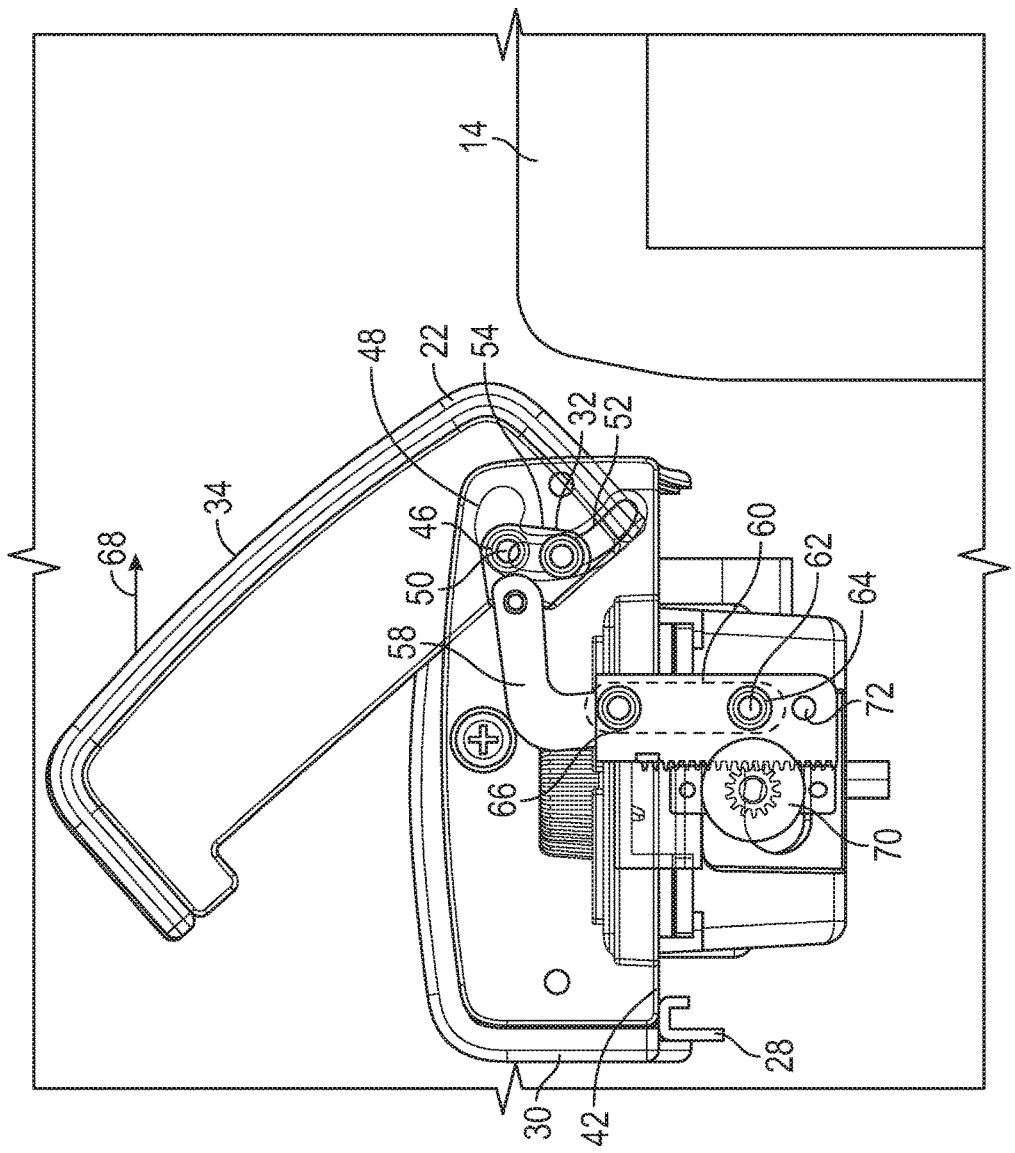
Figure 6:
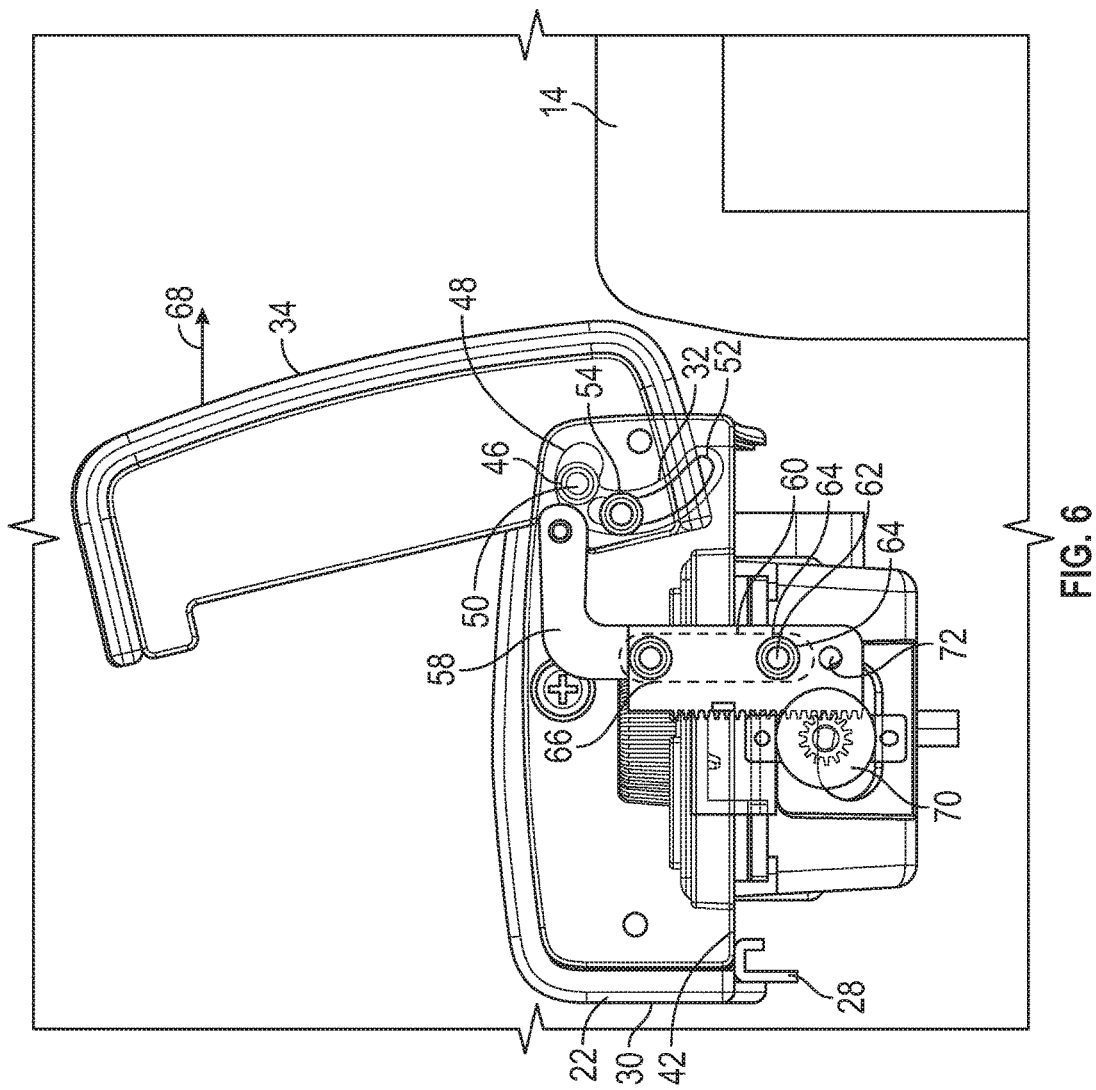

During movement of the armrest lid 34, for example, from the closed position 40 as illustrated in FIG. 2 to a fully open position 44 as illustrated in FIGS. 7 and 10 (note FIGS. 3-6 and 8-9 shows intermediate stages of opening and/or closing the armrest lid), force is transferred from, for example, a seat occupant's hand to an upper corner (e.g., left-hand corner in this example) of the armrest lid 34 in a direction of lid opening (indicated by single headed arrow 68). As the armrest lid 34 moves in the direction 68 of lid opening, the two shafts 50 that are attached the armrest lid 34 move with the armrest lid 34 while the two guide bearings 46 on the shafts 50 ride in the track 48 that is formed in the fixed armrest portion 30. The coupler link 54 that is also coupled to the two shafts 50 moves accordingly with the armrest lid 34 transferring motion and/or force to the shaft 72 rotationally coupled to the lower portion of the damper gear 60. As such, the damper gear 60 is pulled or moves upward. The bearings 64 that are coupled to the damper gear 60 and are riding in the vertical track or slot 66 formed in the fixed armrest portion 30 ensures that the damper gear 60 moves substantially vertically or linearly upward so that the teeth of the damper gear 60 can mesh with the teeth of the damper 70. The damper 70 is configured to control the speed and/or force for opening and closing the armrest lid 34. The track 48 in which the guide bearings 46 are moving, control and/or limit the range of opening of the armrest lid 34 so that the armrest lid 34 does not interfere, for example, with the sidewall ledge 14 when the seat assembly 10 is stowed outboard. Further, the damper gear 60 and the damper 70 dampen movement (e.g., dampen or control speed and force) of the armrest lid 34 during opening and closing to help prevent the armrest lid 34 from unintentionally opening and closing, for example, when a passenger is getting out of the seat or otherwise. In this example, the hinge arrangement 32 as described above includes a dampening function.

Referring to FIGS. 11-13, the second end or other end (e.g., 36 or 38) of the armrest lid 34 may include a hinge arrangement 132, for example, as discussed above in relation to FIGS. 2-10 but without the dampening function. In this example and as illustrated, the hinge arrangement 132 includes the track 48, guide bearings 46, and shafts 50 as discussed above but without the dampening function that is provided by the coupler link 54, damper link 58, damper gear 60, and damper 70 and associated bearings 64, pins, and/or shafts 72.

Figure 25:
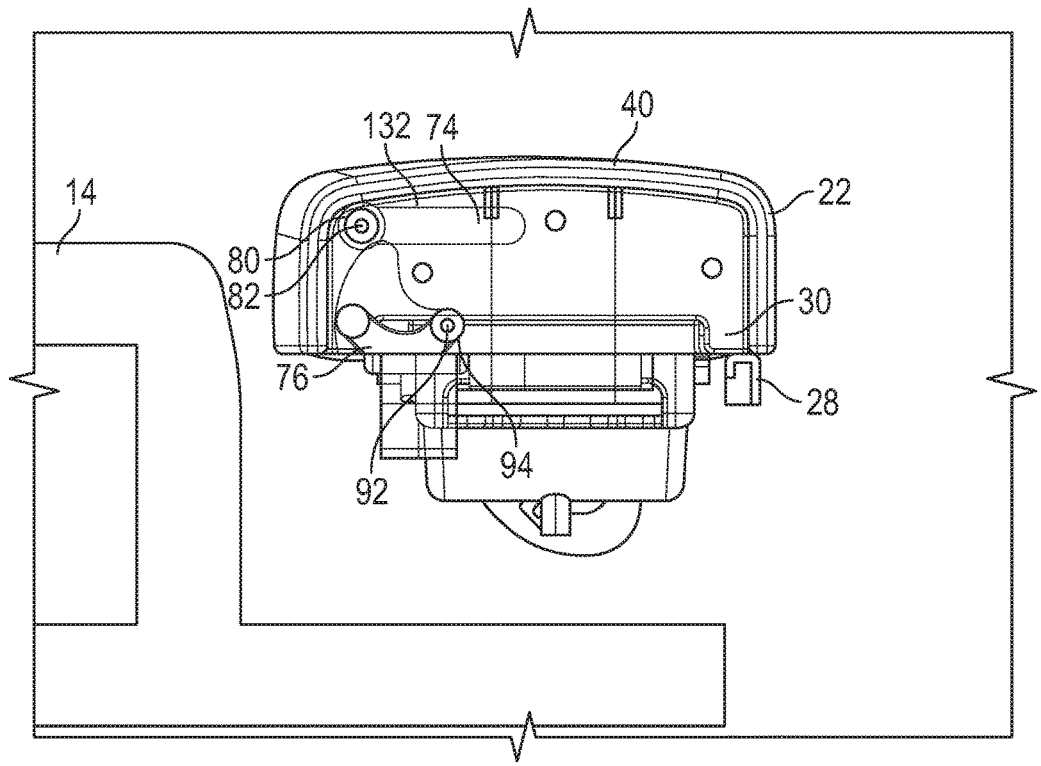
Figure 26:
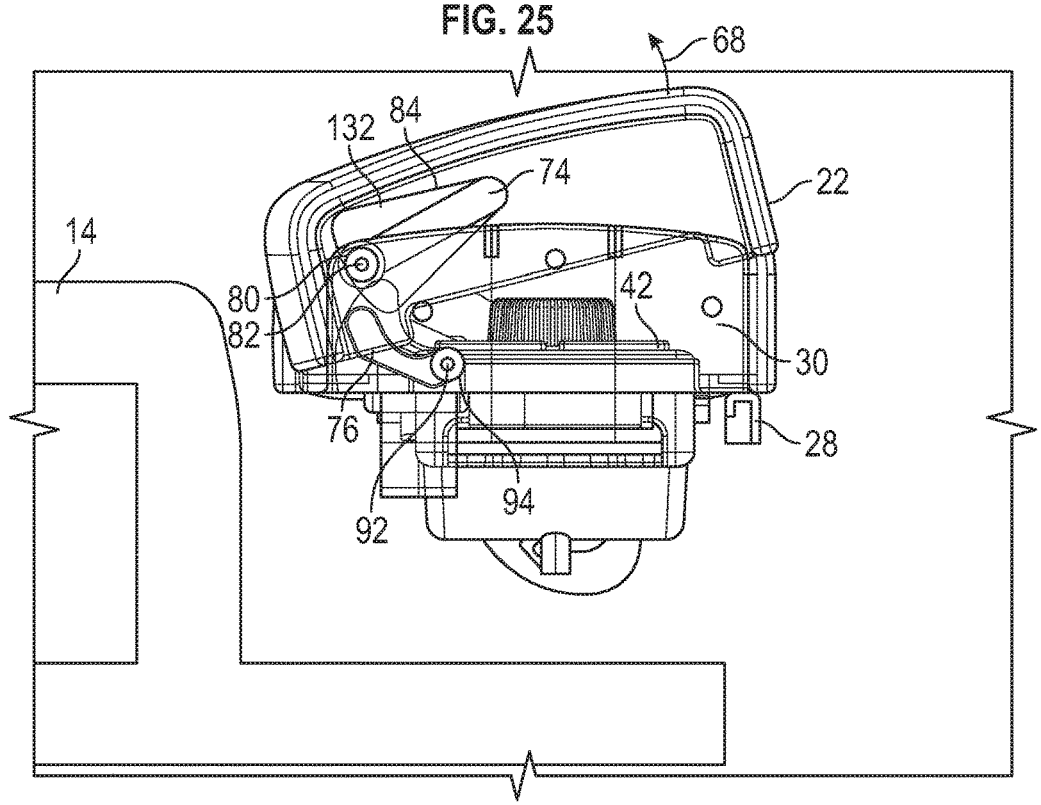
Figure 27:
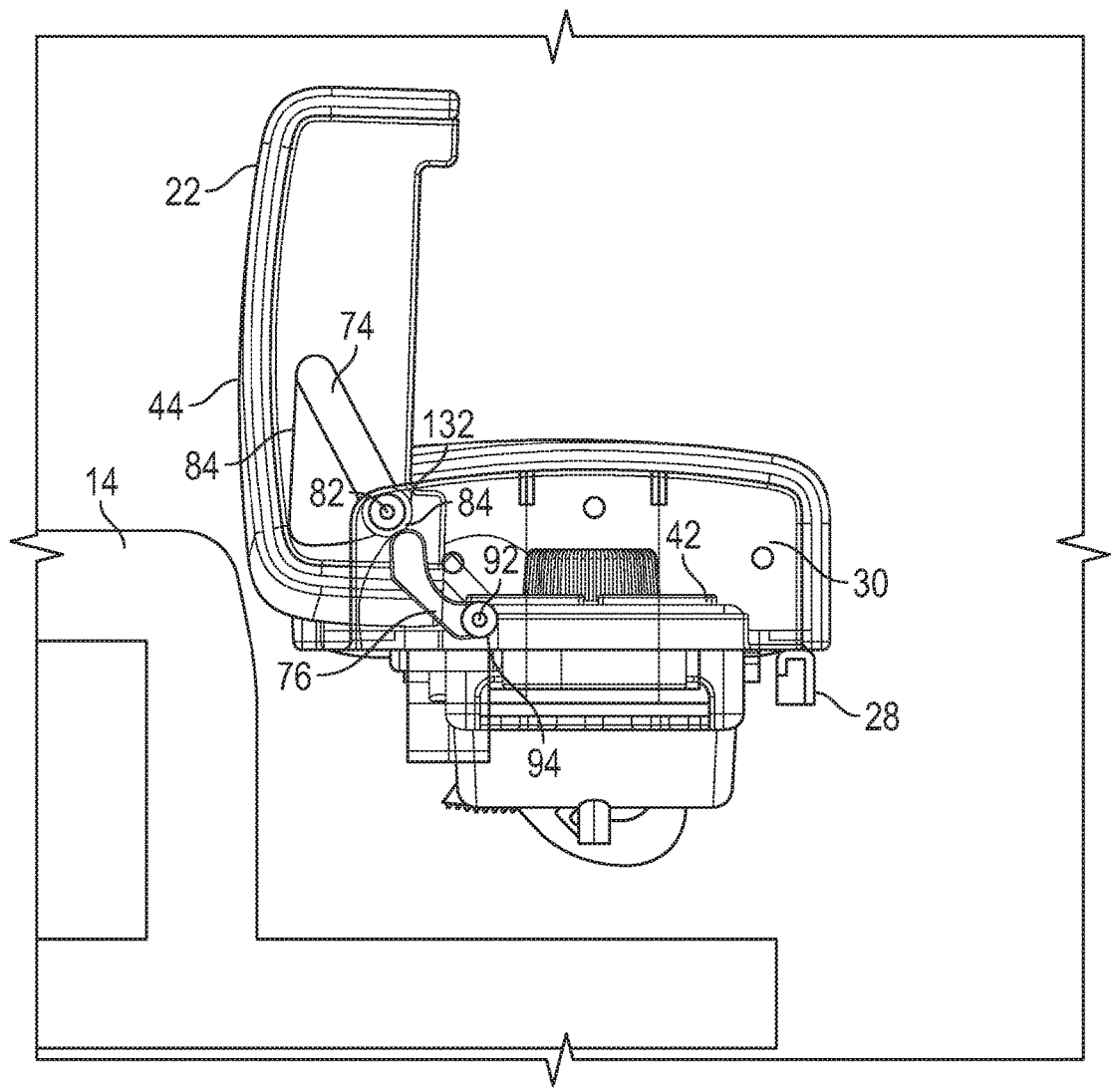

FIGS. 14-27 includes various views of an armrest 22 including an armrest lid 34 and a hinge arrangement 32 in accordance with a second exemplary embodiment. FIGS. 14-20 are sectional views of a first end of the armrest lid 34 and the hinge arrangement 32 during various stages of opening and/or closing of the armrest lid 34. FIGS. 21-24 are perspective side views of the armrest lid 34 and the hinge arrangement 32 during various stages of opening and/or closing the armrest lid 34. FIGS. 25-27 are sectional views of a second end of the armrest lid 34 and the hinge arrangement 32 during various stages of opening and/or closing the armrest lid 34. The first end of the armrest lid 34 may be a forward armrest lid end 36, or alternatively, a rearward armrest lid end 38, and the second end of the armrest lid is an end of the armrest lid 34 opposite the first end (see FIG. 1).

Figure 14:
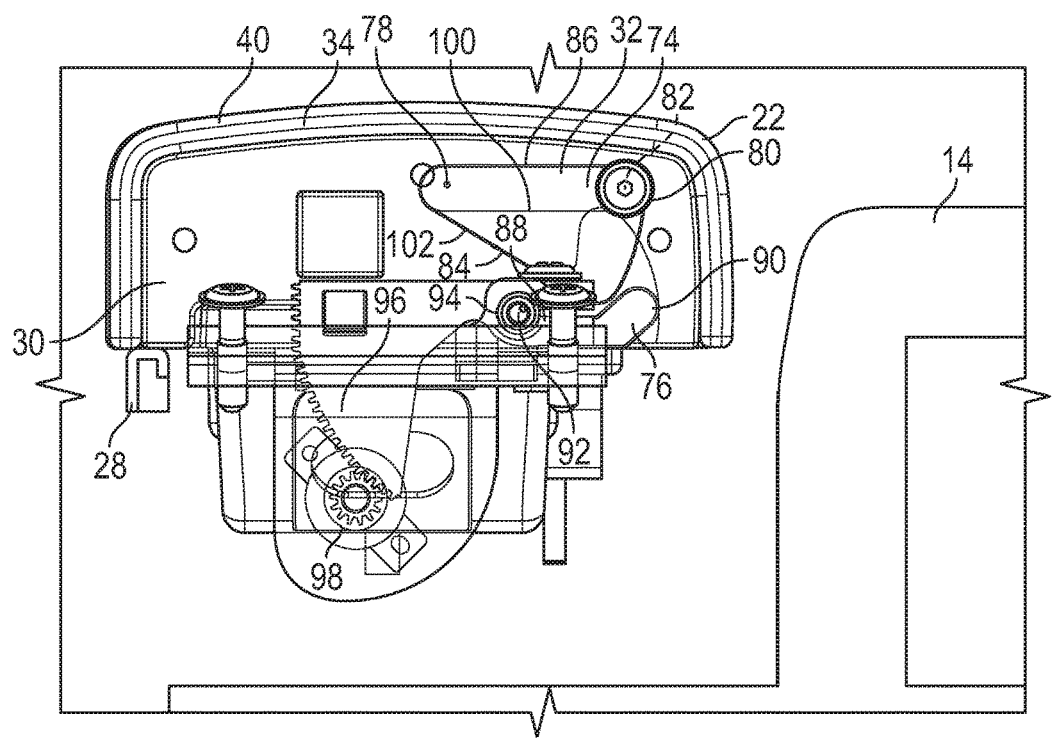
FIGS. 14-27 includes various views of an armrest including an armrest lid and a hinge arrangement in accordance with another exemplary embodiment.
Figure 15:
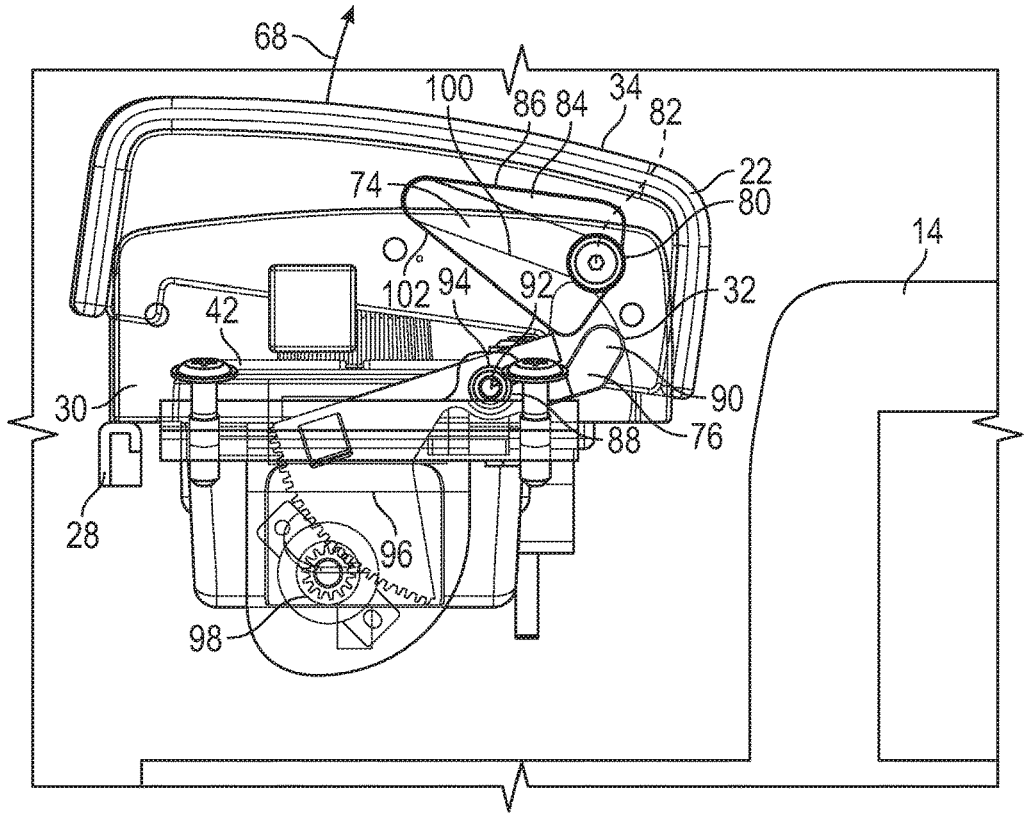
Figure 16:
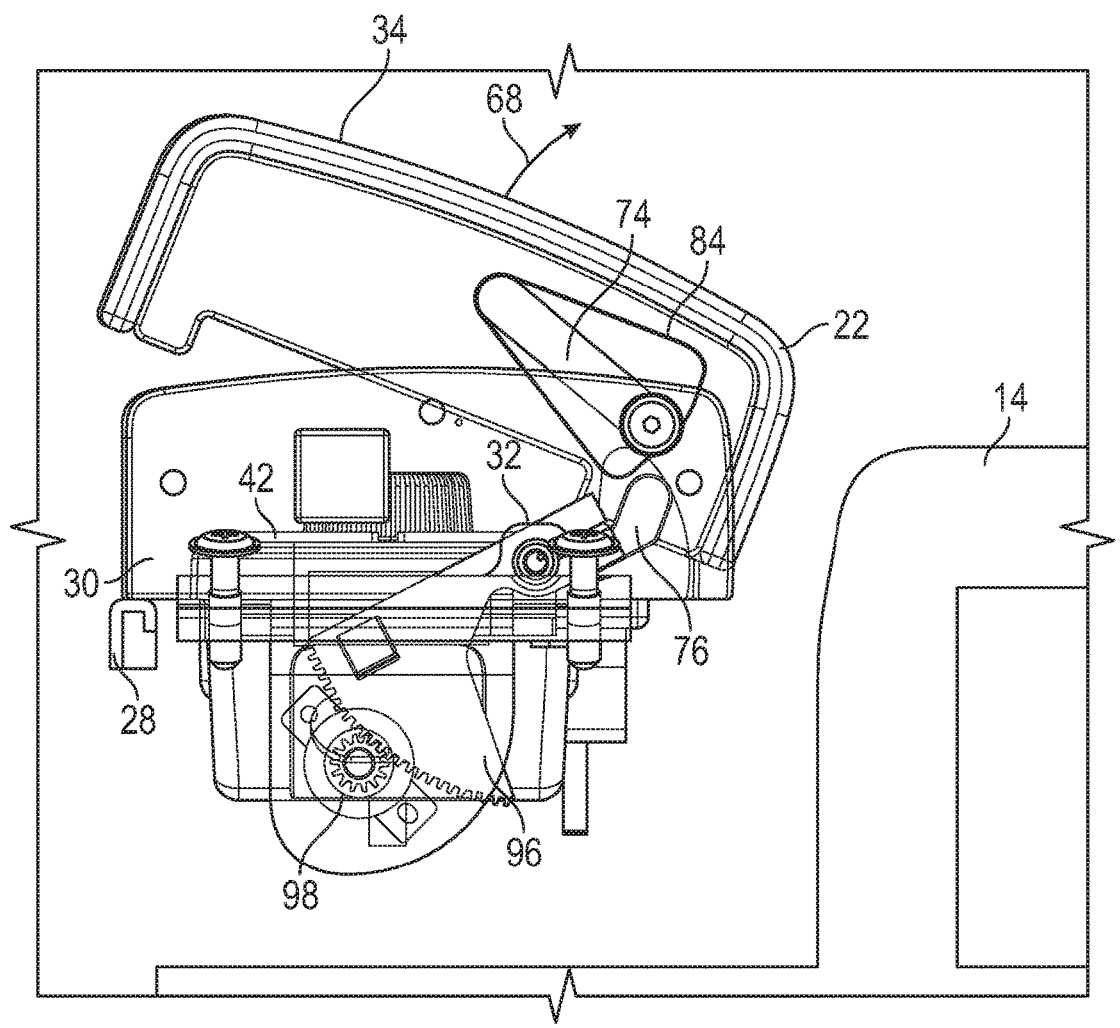
Figure 17:
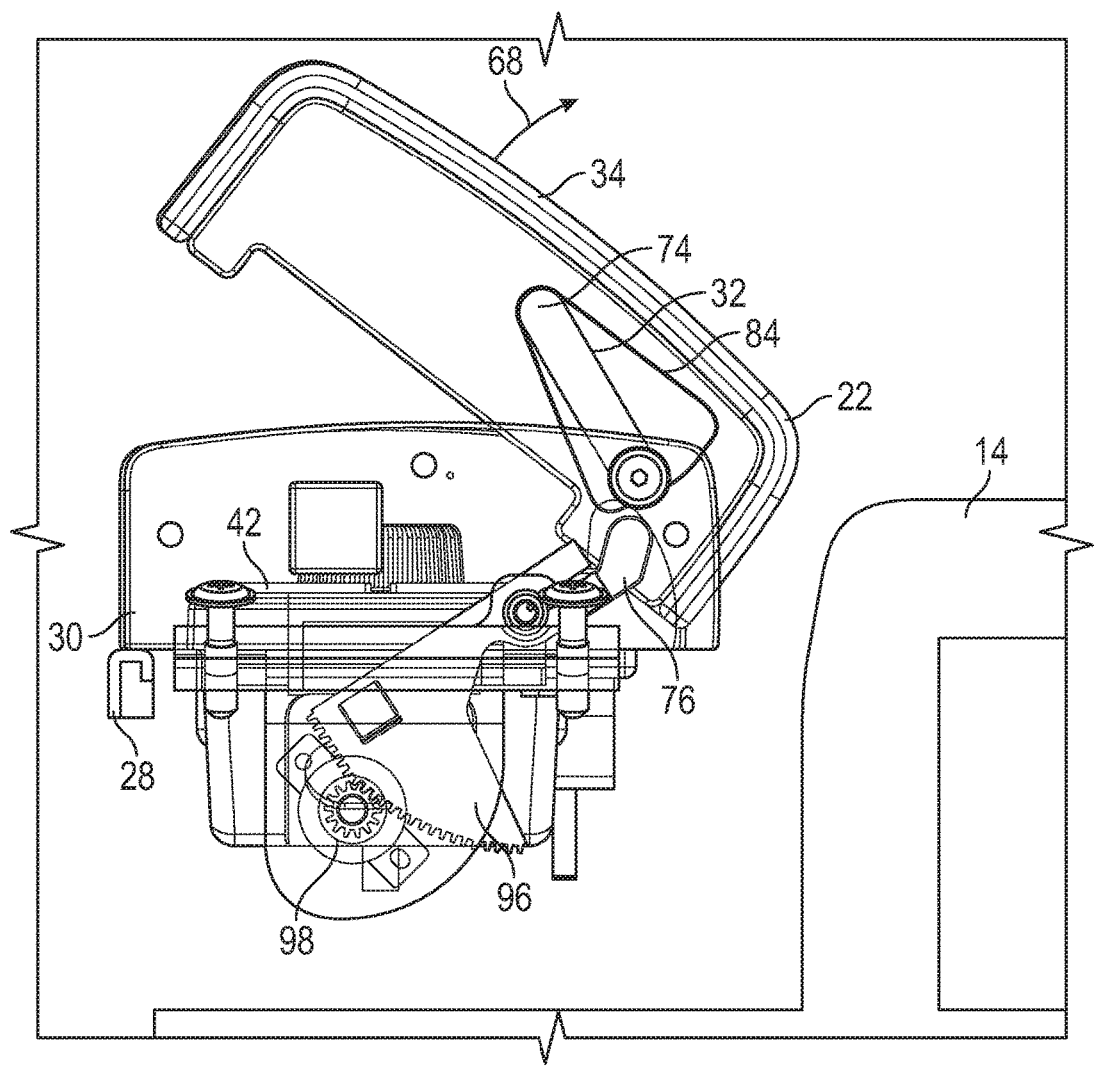
Figure 18:
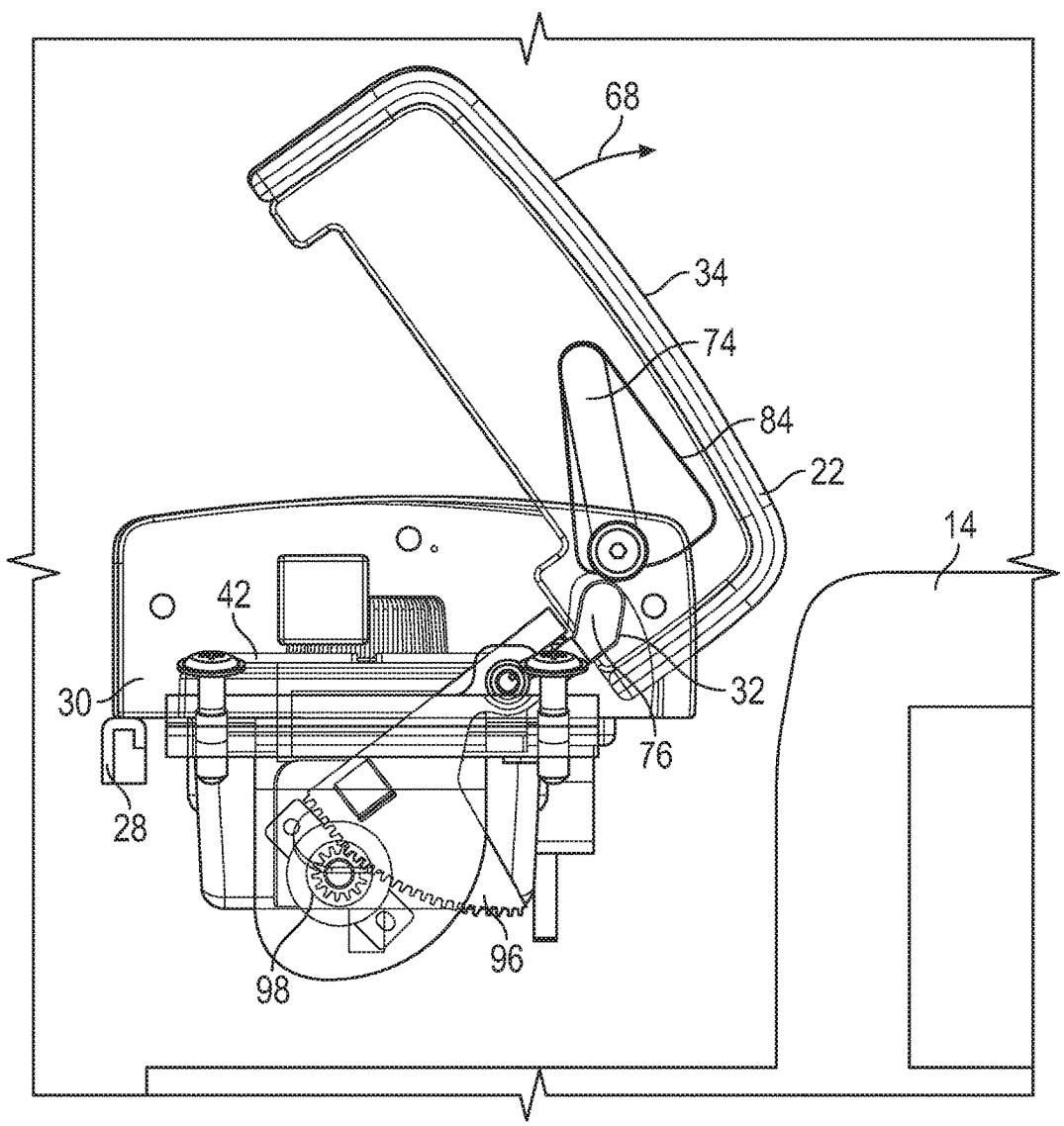
Figure 19:
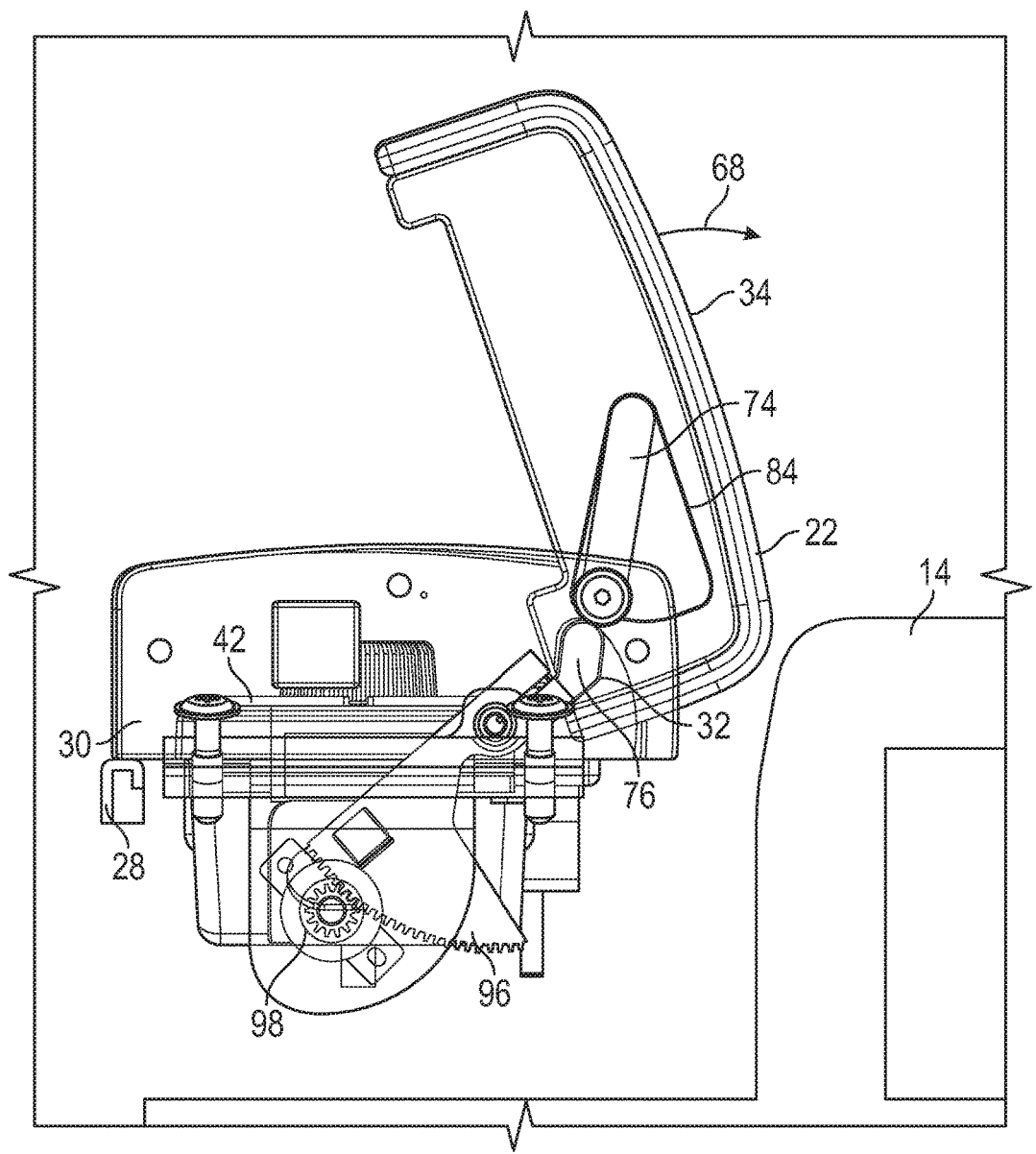

Referring to FIGS. 14-24. As illustrated, the armrest 22 includes a fixed armrest portion 30, and the armrest lid 34 that is pivotably coupled to the fixed armrest portion 30 by the hinge arrangement 32. As illustrated, the hinge arrangement 32 includes two links 74 and 76, e.g., an upper link 74 and a lower link 76. The upper link 74 is rotationally coupled to the armrest lid 34 (e.g., via a pin 78 or like) with an axis of rotation (e.g., center of pin 78) proximate the left end portion of the upper link 74. The right end portion of the upper link 74 includes a bearing 80 (e.g., a head of a shoulder bolt) that is attached to a shaft 82 (e.g., shaft portion of a shoulder bolt) that is attached to the fixed armrest portion 30. The upper link 74 is disposed in a track 84 (e.g., recess, or depression) that includes, for example sidewalls, and as illustrated, has a substantially pie-shaped configuration. In the fully closed position 40 as illustrated in FIG. 14, the upper edge 86 of the upper link 74 rest against the upper sidewall of the pie-shaped track 84.

The lower link 76 has a left end portion 88 and a right end portion 90. The right end portion 90 of the lower link 76 is rotationally coupled to the armrest lid 34. The left end portion 88 of the lower link 76 is rotationally coupled to the fixed armrest portion 30 and includes a shaft 92 that is coupled to the lower link 76 and a bearing 94 that is disposed about the shaft 92. The shaft 92 is fixedly coupled to a damper gear 96. The damper gear 96 has teeth that mesh with teeth of a damper 98 (e.g., rotational damper).

Figure 20:
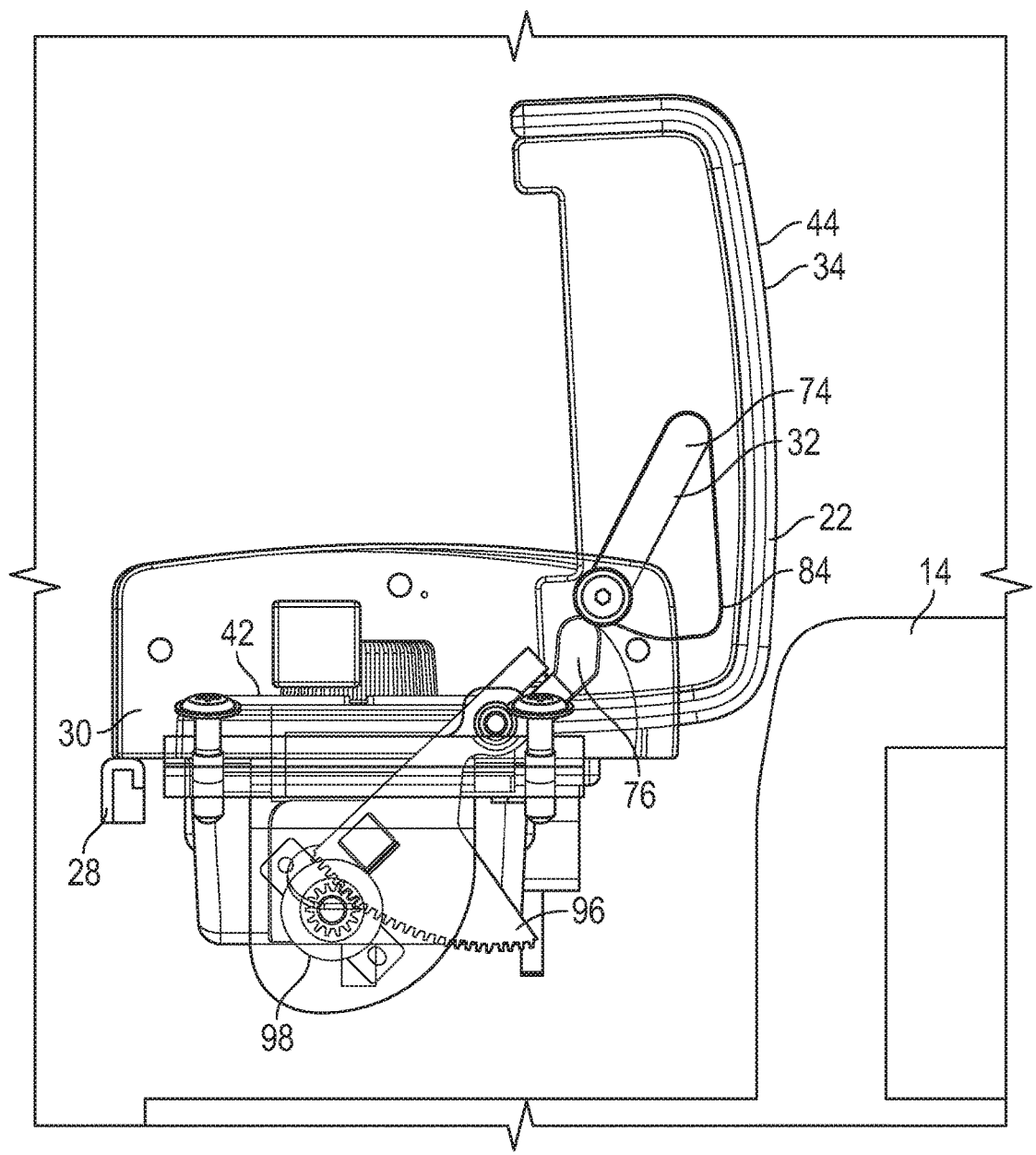
Figure 21:
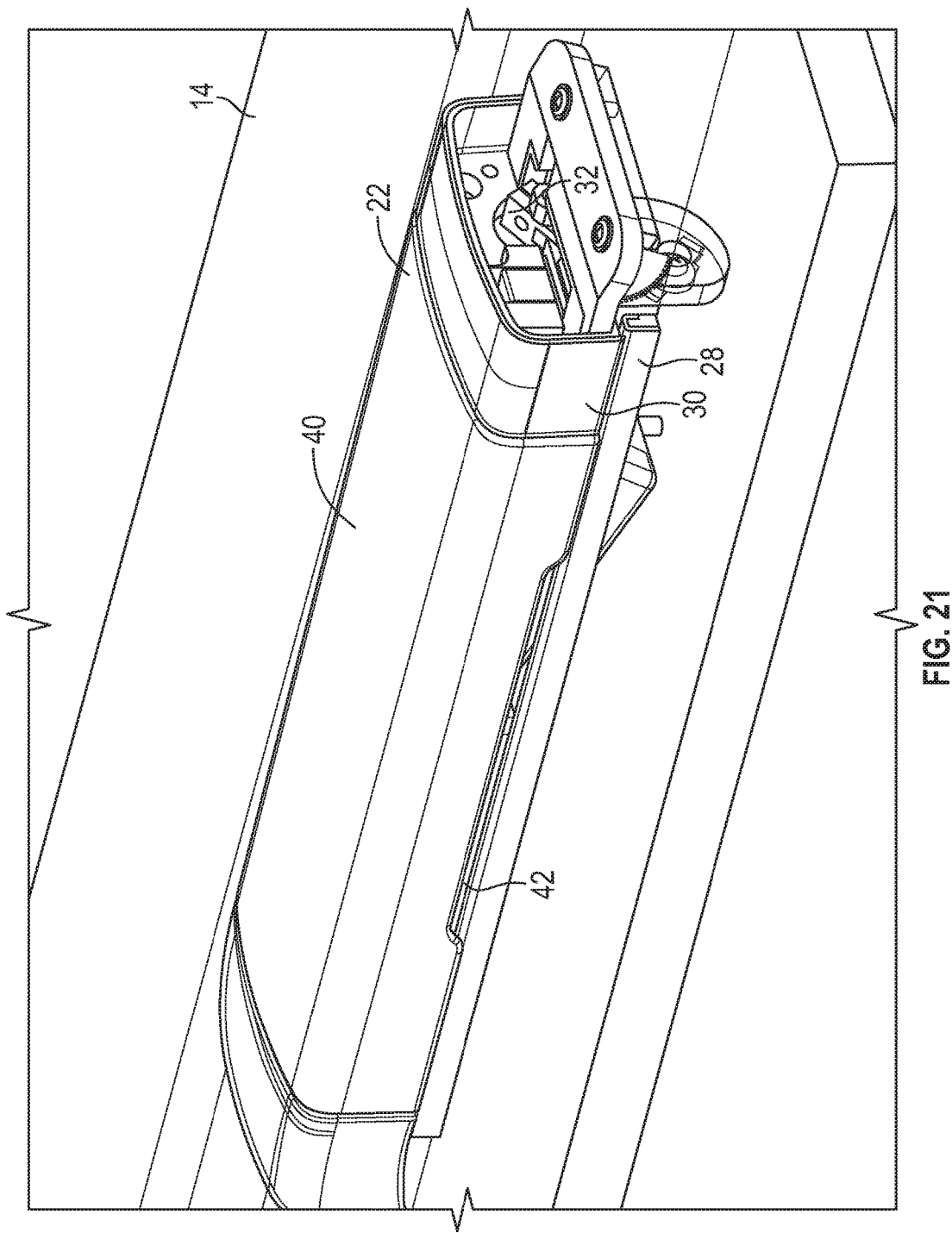
Figure 22:
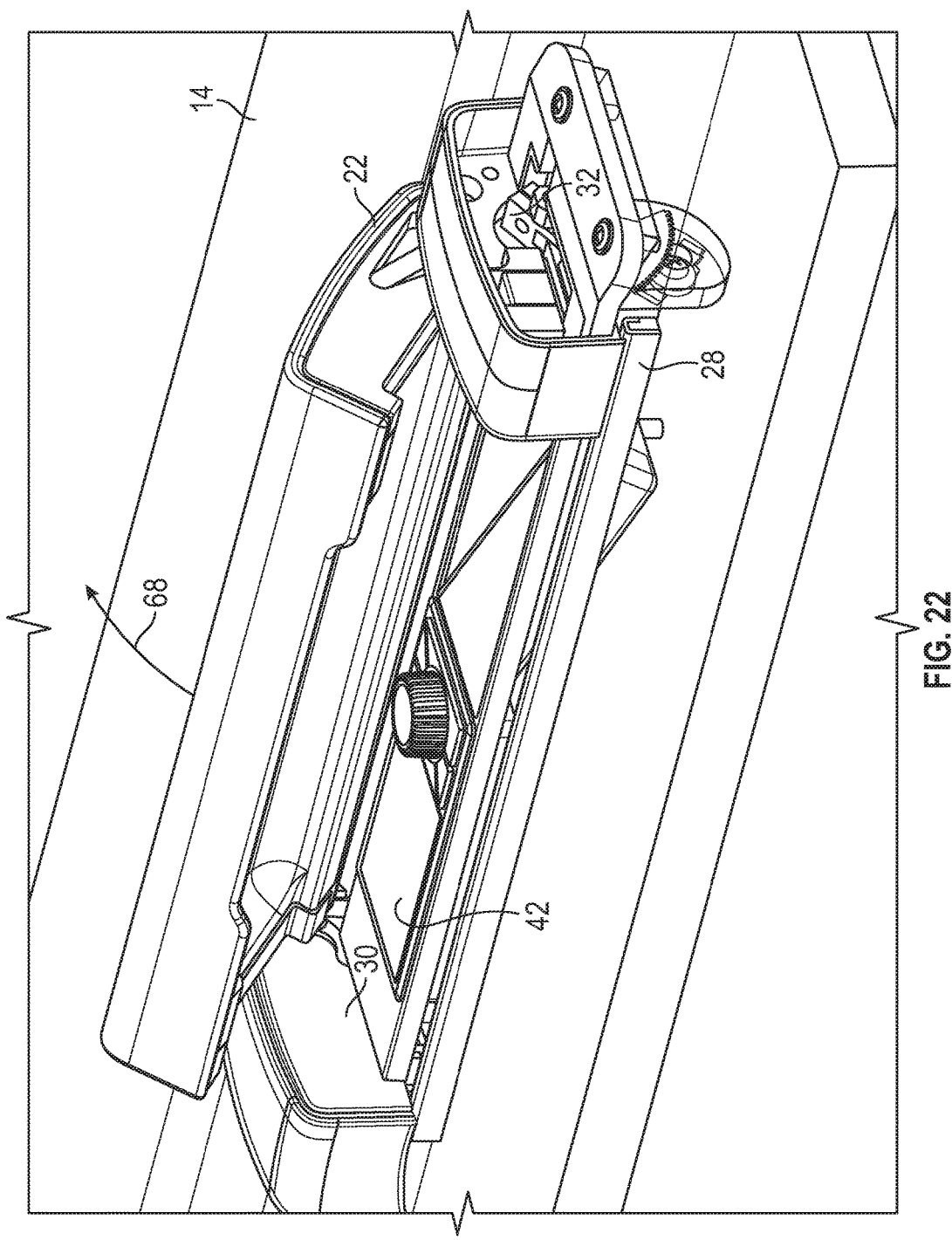
Figure 23:
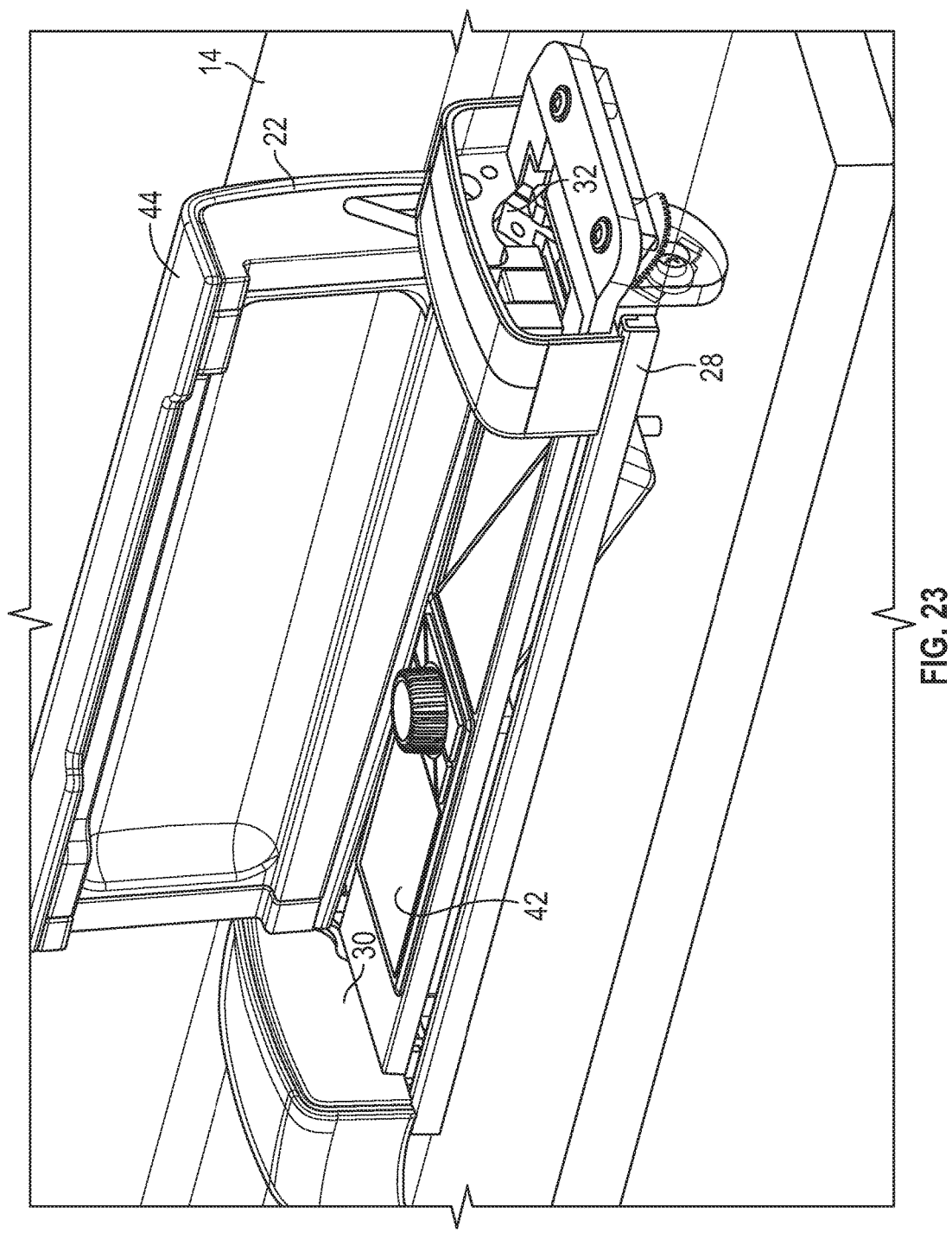
Figure 24:
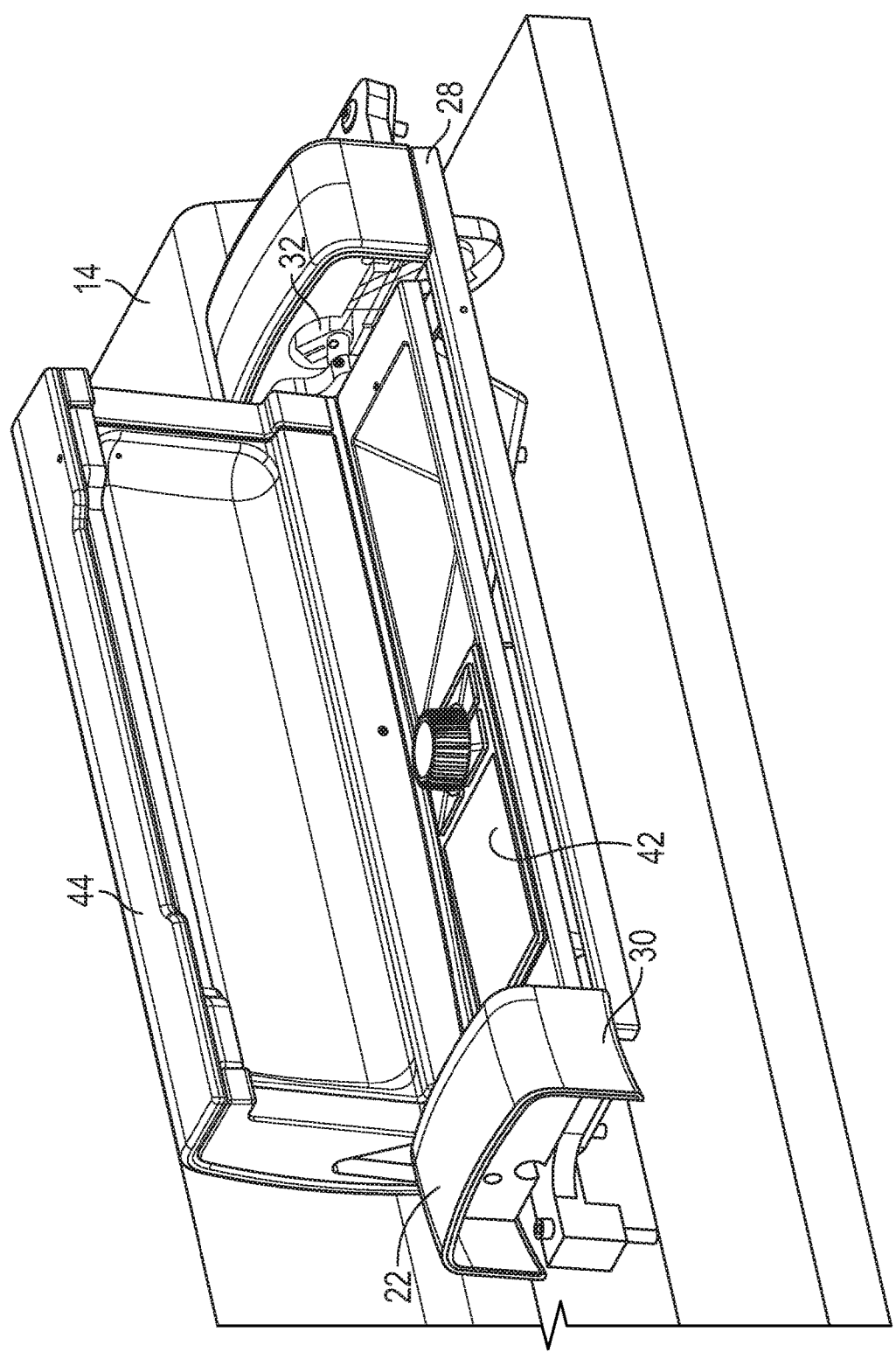

During movement of the armrest lid 34, for example, from a closed position 40 as illustrated in FIG. 14 to a fully open position 44 as illustrated in FIGS. 20 and 24 (note FIGS. 15-19 and 21-23 shows intermediate stages of opening and/or closing the armrest lid 34), force is transferred from, for example, a seat occupant's hand to an upper corner (e.g., left-hand corner in this example) of the armrest lid 34 in a direction 68 of lid opening. As the armrest lid 34 moves in the direction 68 of lid opening, the upper link 74 rotates about the axis of rotation such that the upper edge 86 of the upper link 74 moves away from the upper sidewall of the track 84 while the lower edge 100 of the upper link 74 approaches the lower sidewall 102 of the track 84. When the lower edge 100 of the upper link 74 bottoms out or contacts the lower sidewall 102 of the track 84, the armrest lid 34 is in the fully open position 44, thereby controlling and/or limiting the range of opening of the armrest lid 34 so that the armrest lid 34 does not interfere, for example, with a sidewall ledge 14 when the seat assembly 10 is stowed outboard.

Further, the right end portion 90 of the lower link 76 moves with the armrest lid 34 while the left end portion 88 of the lower link 76, which is rotationally coupled to the fixed armrest portion 30, rotates about an axis of rotation such that the shaft 92 correspondingly rotates the damper gear 96, which has teeth that mesh with the teeth of the damper 98. The damper 98 is attached to the fixed armrest portion 30 and is configured to provide a dampening function. The dampening function as discussed above, dampens movement (e.g., dampen or control speed and force) of the armrest lid 34 during opening and/or closing to help prevent the armrest lid 34 from unintentionally opening and closing, for example, when a passenger is getting out of the seat or otherwise.

Referring to FIGS. 25-27, the second end or other end (e.g., 36 or 38) of the armrest lid 34 may include a hinge arrangement 132, for example, as discussed above in relation to FIGS. 14-24 but without the dampening function. In this example and as illustrated, the hinge arrangement 132 includes the two links 74 and 76, the track 84, bearings 80 and 94, and shafts 82 and 92 as discussed above but without the dampening function that is provided by the damper gear 96 and damper 98 and associated bearings, pins, and/or shafts.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A seat assembly comprising:
a seat base portion and a seat backrest portion that include at least in part a seat frame that supports the seat backrest portion extending substantially upright from the seat base portion; and
an armrest disposed adjacent to the seat base portion and forward of the backrest portion, wherein the armrest comprises:
a fixed armrest portion that is coupled to the seat frame; and
an armrest lid configured to move relative to the fixed armrest portion between a closed position overlying an upper section of the fixed armrest portion and an open position allowing access to the upper section of the fixed armrest portion; and
a hinge arrangement pivotably coupling the armrest lid to the fixed armrest portion, wherein the hinge arrangement comprises a damper and a damper gear that meshes with the damper to dampen movement of the armrest lid between the closed and open positions, wherein the damper gear is coupled to the armrest lid, and wherein the fixed armrest portion defines a track and the hinge arrangement further comprises:
at least one guide bearing coupled to the armrest lid and movably disposed in the track to limit a range of opening of the armrest lid; and
a linkage coupling the at least one guide bearing to the damper gear to move the damper gear during movement of the armrest lid, wherein the hinge arrangement further comprises at least one shaft coupled to the armrest lid and disposed through the at least one guide bearing, and wherein the linkage comprises:
a coupler link coupled to the at least one shaft; and
a damper link coupled to the coupler link and the damper gear.

2. The seat assembly of claim 1, wherein the damper is coupled to the fixed armrest portion.

3. The seat assembly of claim 2, wherein the damper is a rotational damper.

4. The seat assembly of claim 1, wherein the fixed armrest portion defines a slot formed through an intermediate portion of the track, and wherein the at least one shaft is disposed through the slot.

5. The seat assembly of claim 4, wherein the slot is configured as a curved slot.

6. The seat assembly of claim 1, wherein the at least one guide bearing rotates about the at least one shaft during movement of the armrest lid between the closed and open positions.

7. The seat assembly of claim 1, wherein the coupler link has at least one hole formed therethrough with a portion of the at least one shaft disposed in the at least one hole.

8. The seat assembly of claim 1, wherein the coupler link has a substantially triangular shape.

9. The seat assembly of claim 1, wherein the damper link is rotationally coupled to the coupler link.

10. The seat assembly of claim 9, wherein damper gear is rotationally coupled to the damper link.

11. The seat assembly of claim 1, wherein the fixed armrest portion defines a vertical track and the hinge arrangement further comprises at least one bearing moveably disposed in the vertical track and coupled with the damper gear so that the damper gear is guided to move substantially vertically when the armrest lid moves between the closed and open positions.

12. A seat assembly comprising:
a seat base portion and a seat backrest portion that include at least in part a seat frame that supports the seat backrest portion extending substantially upright from the seat base portion; and
an armrest disposed adjacent to the seat base portion and forward of the backrest portion, wherein the armrest comprises:
a fixed armrest portion that is coupled to the seat frame; and
an armrest lid configured to move relative to the fixed armrest portion between a closed position overlying an upper section of the fixed armrest portion and an open position allowing access to the upper section of the fixed armrest portion; and
a hinge arrangement pivotably coupling the armrest lid to the fixed armrest portion, wherein the hinge arrangement comprises a damper and a damper gear that meshes with the damper to dampen movement of the armrest lid between the closed and open positions, wherein the damper gear is coupled to the armrest lid, and wherein the fixed armrest portion defines a track and the hinge arrangement further comprises:
a first link rotationally coupled to the armrest lid and movably disposed in the track to limit a range of opening of the armrest lid; and
a second link having a first end portion that is rotationally coupled with the armrest lid and a second end portion that is coupled with the damper gear to move the damper gear during movement of the armrest lid.

13. The seat assembly of claim 12, wherein the hinge arrangement further comprises a pin that rotationally couples the first link to the armrest lid.

14. The seat assembly of claim 12, wherein the first link has a third end portion that is rotationally coupled to the armrest lid and a fourth end that is coupled with the fixed armrest portion.

15. The seat assembly of claim 12, wherein the hinge arrangement further comprises:
a shaft that couples the second end portion of the second link with the damper gear.

16. The seat assembly of claim 15, wherein the shaft rotates the damper gear during movement of the armrest lid.

17. A seat assembly comprising:
a seat base portion and a seat backrest portion that include at least in part a seat frame that supports the seat backrest portion extending substantially upright from the seat base portion; and
an armrest disposed adjacent to the seat base portion and forward of the backrest portion, wherein the armrest has a first end section and a second end section that is opposite the first end section and comprises:
a fixed armrest portion that is coupled to the seat frame; and an armrest lid configured to move relative to the fixed armrest portion between a closed position overlying an upper section of the fixed armrest portion and an open position allowing access to the upper section of the fixed armrest portion;

a first hinge arrangement disposed in the first end section of the armrest and pivotably coupling a first part of the armrest lid to the fixed armrest portion, wherein the first hinge arrangement comprises a damper and a damper gear that meshes with the damper to dampen movement of the armrest lid between the closed and open positions; and a second hinge arrangement disposed in the second end section of the armrest and pivotably coupling a second part of the armrest lid to the fixed armrest portion, wherein the second hinge arrangement defines a track and the hinge arrangement further comprises:

one of a guide bearing and a link coupled to the armrest lid and movably disposed in the track to limit a range of opening of the armrest lid.

\* \* \* \* \*